(12) United States Patent
Wang et al.

(10) Patent No.: US 10,594,451 B2
(45) Date of Patent: Mar. 17, 2020

(54) UPLINK COMMON BURST SYMBOL CONFIGURATION

(71) Applicant: QUALCOMM Incorporated, San Diego, CA (US)

(72) Inventors: Renqiu Wang, San Diego, CA (US); Hao Xu, Beijing (CN); Peter Gaal, San Diego, CA (US); Wanshi Chen, San Diego, CA (US); Tingfang Ji, San Diego, CA (US); Shimman Arvind Patel, San Diego, CA (US); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/674,325

(22) Filed: Aug. 10, 2017

(65) Prior Publication Data

US 2018/0054282 A1 Feb. 22, 2018

Related U.S. Application Data

(60) Provisional application No. 62/378,132, filed on Aug. 22, 2016.

(51) Int. Cl.
*H04L 5/00* (2006.01)
*H04W 72/04* (2009.01)
*H04W 72/12* (2009.01)

(52) U.S. Cl.
CPC .......... *H04L 5/0007* (2013.01); *H04L 5/0048* (2013.01); *H04L 5/0053* (2013.01); *H04W 72/044* (2013.01); *H04W 72/1268* (2013.01)

(58) Field of Classification Search
CPC ... H04L 5/0007; H04L 5/0053; H04L 5/0048; H04W 72/1268; H04W 72/044
See application file for complete search history.

(56) References Cited

U.S. PATENT DOCUMENTS

2010/0034152 A1* 2/2010 Imamura ............... H04L 5/0007
370/329
2010/0067591 A1* 3/2010 Luo ....................... H04L 1/0025
375/260

(Continued)

OTHER PUBLICATIONS

International Search Report and Written Opinion—PCT/US2017/046606—ISA/EPO—dated Jan. 11, 2018.

(Continued)

*Primary Examiner* — Hashim S Bhatti

(74) *Attorney, Agent, or Firm* — Holland & Hart LLP/Qualcomm

(57) ABSTRACT

Methods, systems, and devices for wireless communication are described that provide for uplink common burst symbol waveform selection and configuration. A waveform for the uplink common burst symbol may be selected to be a single-carrier frequency division multiplexing (SC-FDM) waveform, an orthogonal frequency division multiplexing (OFDM) waveform, or combinations thereof, based at least in part on information that is to be transmitted. A pattern for SC-FDM sequences may be selected to provide enhanced channel estimation through common pilot tones across different sequences, wideband or narrowband sequences may be selected based at least in part on information to be transmitted, and acknowledgment feedback may be transmitted in an end portion of the uplink common burst symbol in some cases to provide additional processing time for determining the acknowledgment feedback.

28 Claims, 25 Drawing Sheets

(56) References Cited

U.S. PATENT DOCUMENTS

| | | | |
|---|---|---|---|
| 2013/0136084 A1* | 5/2013 | Zhang | H04W 72/0413 370/329 |
| 2014/0146754 A1* | 5/2014 | Bayesteh | H04L 1/0001 370/329 |
| 2015/0085764 A1* | 3/2015 | Xiong | H04W 76/38 370/329 |
| 2015/0222402 A1* | 8/2015 | Ouchi | H04L 1/00 370/329 |
| 2016/0205690 A1* | 7/2016 | Berggren | H04L 5/001 370/280 |
| 2017/0188352 A1* | 6/2017 | Lee | H04L 1/18 |
| 2017/0251463 A1* | 8/2017 | Kwak | H04L 5/00 |
| 2018/0062796 A1* | 3/2018 | Feng | H04L 1/1812 |
| 2018/0242360 A1* | 8/2018 | Noh | H04L 1/1861 |

OTHER PUBLICATIONS

Partial International Search Report—PCT/US2017/046606—ISA/EPO—dated Nov. 17, 2017.

Qualcomm Incorporated: "Scaled Numerology Control Design for NR"; 3GPP Draft: R1-166363 Scaled Numerology Control Design for NR, 3rd Generation Partnership Project (3GPP), vol. RAN WG1, No. Gothenburg, Sweden; Aug. 22, 2016-Aug. 26, 2016; Aug. 21, 2016 (Aug. 21, 2016), XP051140183, 10 Pages, Retrieved from the Internet: URL: http://www.3gpp.org/ftp/Meetings%203GPP_SYNC/RAN1/Docs/ [retrieved on Aug. 21, 2016].

Texas Instruments: "Sounding Reference Signal in Support of Scheduling Request in E-UTRA", 3GPP Draft; R1-080700_SRSRS, 3rd Generation Partnership Project (3GPP), vol. RAN WG1, No. Sorrento, Italy; Feb. 6, 2008, Feb. 6, 2008 (Feb. 6, 2008), XP050109194, pp. 1-7, [retrieved on Feb. 6, 2008].

* cited by examiner

| Seq. 1 | Seq. 2 | Seq. 3 |
|---|---|---|
| +1 | +1 | +1 |
| +1 | −0.0500, −0.866j | −0.0500, +0.866j |
| +1 | −0.0500, +0.866j | −0.0500, −0.866j |
| +1 | +1 | +1 |
| +1 | −0.0500, −0.866j | −0.0500, +0.866j |
| +1 | −0.0500, +0.866j | −0.0500, −0.866j |
| +1 | +1 | +1 |
| +1 | −0.0500, −0.866j | −0.0500, +0.866j |

805 — Seq. 1
810 — Seq. 2
815 — Seq. 3

UPLINK COMMON BURST SYMBOL CONFIGURATION

CROSS REFERENCES

The present Application for Patent claims priority to U.S. Provisional Patent Application No. 62/378,132 by Wang, et al., entitled "Uplink Common Burst Symbol Configuration," filed Aug. 22, 2016, assigned to the assignee hereof.

INTRODUCTION

The following relates generally to wireless communication, and more specifically to uplink common burst symbol configuration.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

In some examples, a wireless multiple-access communication system may include a number of base stations, each simultaneously supporting communication for multiple communication devices, otherwise known as user equipment (UEs). In a Long-Term Evolution (LTE) or LTE-Advanced (LTE-A) network, a set of one or more base stations may define an eNodeB (eNB). In other examples (e.g., in a next generation or 5G network), a wireless multiple access communication system may include a number of smart radio heads (radio heads (RHs)) in communication with a number of access node controllers (ANCs), where a set of one or more radio heads, in communication with an ANC, defines an eNB. A base station or radio head may communicate with a set of UEs on downlink (DL) channels (e.g., for transmissions from a base station or radio head to a UE) and uplink (UL) channels (e.g., for transmissions from a UE to a base station or radio head).

Subframes of communication between a network access device (e.g., an eNB, an ANC, a RH, or a base station) and a plurality of UEs may include different regions or channels that are assembled in accordance with a time division duplex (TDD) and/or frequency division duplex (FDD) subframe structure. Subframes may additionally or alternatively include arrangements of UL channels and/or DL channels. In subframes that include both UL and DL channels, processing timelines for determination and formatting of uplink data may present challenges for some UEs.

SUMMARY

A method of wireless communication is described. The method may include identifying an uplink common burst symbol in a wireless communication subframe, determining information to be transmitted in the uplink common burst symbol, and selecting a transmission waveform for the uplink common burst symbol based at least in part on the information to be transmitted in the uplink common burst symbol.

An apparatus for wireless communication is described. The apparatus may include means for identifying an uplink common burst symbol in a wireless communication subframe, means for determining information to be transmitted in the uplink common burst symbol, and means for selecting a transmission waveform for the uplink common burst symbol based at least in part on the information to be transmitted in the uplink common burst symbol.

Another apparatus for wireless communication is described. The apparatus may include a processor, memory in electronic communication with the processor, and instructions stored in the memory. The instructions may be operable to cause the processor to identify an uplink common burst symbol in a wireless communication subframe, determine information to be transmitted in the uplink common burst symbol, and select a transmission waveform for the uplink common burst symbol based at least in part on the information to be transmitted in the uplink common burst symbol.

A non-transitory computer-readable medium for wireless communication is described. The non-transitory computer-readable medium may include instructions operable to cause a processor to identify an uplink common burst symbol in a wireless communication subframe, determine information to be transmitted in the uplink common burst symbol, and select a transmission waveform for the uplink common burst symbol based at least in part on the information to be transmitted in the uplink common burst symbol.

In some examples of the method, apparatus, and non-transitory computer-readable medium described above, the selecting the transmission waveform comprises selecting one or more of a single-carrier frequency division multiplexing (SC-FDM) waveform or an orthogonal frequency division multiplexing (OFDM) waveform for the uplink common burst symbol based at least in part on the information to be transmitted in the uplink common burst symbol.

In some examples of the method, apparatus, and non-transitory computer-readable medium described above, the set of sequences comprise different sequences transmitted on a same frequency band, each of the different sequences associated with a different combination of scheduling request (SR), or the feedback information, or sounding reference signal (SRS) information, or any combination thereof. In some examples, the same frequency band may be contiguous resource blocks. In some examples, the same frequency band may be dis-contiguous resource blocks.

In some examples of the method, apparatus, and non-transitory computer-readable medium described above, the selecting the transmission waveform further comprises selecting the SC-FDM waveform when the information to be transmitted in the uplink common burst symbol comprises SRS information, SR information, feedback information associated with a downlink transmission, or combinations thereof. Some examples of the method, apparatus, and non-transitory computer-readable medium described above may further include processes, features, means, or instructions for selecting the OFDM waveform when the information to be transmitted in the uplink common burst symbol comprises uplink data.

In some examples of the method, apparatus, and non-transitory computer-readable medium described above, the selecting the transmission waveform further comprises selecting the SC-FDM waveform for a first subset of a set of frequency resources of the uplink common burst symbol and selecting the OFDM waveform for a second subset of the set of frequency resources of the uplink common burst symbol when the information to be transmitted comprises both uplink data and one or more of SRS information, SR information, or feedback information. In some examples of the method, apparatus, and non-transitory computer-readable medium described above, the set of frequency resources comprises a plurality of frequency tones associated with a plurality of subcarriers used to transmit the uplink common burst symbol, and wherein the first subset of the set of frequency resources and the second subset of the set of frequency resources comprise alternating tones of the plurality of frequency tones.

In some examples of the method, apparatus, and non-transitory computer-readable medium described above, the selecting the transmission waveform further comprises selecting a SC-FDM waveform sequence from a set of available SC-FDM sequences based at least in part on the information to be transmitted in the uplink common burst symbol. In some examples of the method, apparatus, and non-transitory computer-readable medium described above, the selecting the SC-FDM sequence comprises determining that the information to be transmitted in the uplink common burst symbol comprises one or more of SRS information, SR information, or feedback information associated with a downlink transmission. Some examples of the method, apparatus, and non-transitory computer-readable medium described above may further include processes, features, means, or instructions for identifying a set of wideband SC-FDM sequences. Some examples of the method, apparatus, and non-transitory computer-readable medium described above may further include processes, features, means, or instructions for selecting the SC-FDM sequence from the set of wideband SC-FDM sequences based at least in part on which of the SRS information, SR information, feedback information, or combinations thereof, may be to be transmitted in the uplink common burst symbol. In some examples, the SR information comprises an indication of whether a SR may be present, and the feedback information comprises an acknowledgment indication, a negative acknowledgment indication, or an indication that the feedback information may be not present, and the set of wideband SC-FDM sequences comprises different wideband SC-FDM sequences each associated with a different combination of SRS, SR, and the feedback information.

In some examples of the method, apparatus, and non-transitory computer-readable medium described above, the selecting the SC-FDM sequence comprises determining that the information to be transmitted in the uplink common burst symbol comprises one or more of SRS information, SR information, or feedback information associated with a downlink transmission. Some examples of the method, apparatus, and non-transitory computer-readable medium described above may further include processes, features, means, or instructions for identifying a set of wideband SC-FDM sequences and a set of narrowband SC-FDM sequences. Some examples of the method, apparatus, and non-transitory computer-readable medium described above may further include processes, features, means, or instructions for selecting the SC-FDM sequence from the set of wideband SC-FDM sequences when SRS information may be to be transmitted in the uplink common burst symbol. Some examples of the method, apparatus, and non-transitory computer-readable medium described above may further include processes, features, means, or instructions for selecting the SC-FDM sequence from the set of narrowband SC-FDM sequences when no SRS information may be to be transmitted in the uplink common burst symbol.

In some examples of the method, apparatus, and non-transitory computer-readable medium described above, the SR information comprises an indication of whether a SR may be present, and the feedback information comprises an acknowledgment indication, a negative acknowledgment indication, or an indication that the feedback information may be not present, wherein the set of wideband SC-FDM sequences comprises different wideband SC-FDM sequences each associated with a different combination of SRS, SR, and the feedback information, and wherein the set of narrowband SC-FDM sequences comprises different narrowband SC-FDM sequences each associated with a different combination of SR, and the feedback information. In some examples, the set of narrowband SC-FDM sequences comprise a same sequence transmitted on different narrowband resources, each of the different narrowband resources associated with a different combination of SR, and the feedback information. In some examples, the set of available SC-FDM sequences may be selected to provide detection based at least in part on cyclic shifts from a base sequence. In some examples, the cyclic shifts may be selected to provide a subset of frequency tones having a same value irrespective of the cyclic shifts from the base sequence.

In some examples of the method, apparatus, and non-transitory computer-readable medium described above, the set of available SC-FDM sequences each may have a sequence length of N and the information to be transmitted in the uplink common burst symbol comprises feedback information having M possible states, and wherein the SC-FDM sequences may be selected to provide equally spaced sequences for M cyclic shifts associated with the M possible states of the feedback information. In some examples of the method, apparatus, and non-transitory computer-readable medium described above, the N may be not a multiple of M. In some examples of the method, apparatus, and non-transitory computer-readable medium described above, the N may be a multiple of M. In some examples of the method, apparatus, and non-transitory computer-readable medium described above, each of the cyclic shifts may be associated with a combination of SRS, SR and feedback information.

In some examples of the method, apparatus, and non-transitory computer-readable medium described above, the information to be transmitted in the uplink common burst symbol comprises uplink data, and wherein the selecting the transmission waveform comprises: selecting an OFDM waveform for at least a portion of the uplink common burst symbol. In some examples, the information to be transmitted in the uplink common burst symbol further comprises SRS information, and the selecting the transmission waveform further comprises selecting a SC-FDM waveform for a first portion of the uplink common burst symbol for transmission of the SRS information, and selecting the OFDM waveform for a second portion of the uplink common burst symbol.

In some examples of the method, apparatus, and non-transitory computer-readable medium described above, the set of frequency resources comprises a plurality of frequency tones associated with a plurality of subcarriers used to transmit the uplink common burst symbol, and the first portion of the uplink common burst symbol and the second portion of the uplink common burst symbol comprise alternating tones of the plurality of frequency tones.

Some examples of the method, apparatus, and non-transitory computer-readable medium described above may further include processes, features, means, or instructions for transmitting a demodulation reference signal (DMRS) in the transmission waveform. In some examples, the uplink data includes feedback information that may be modulated on the DMRS. Some examples of the method, apparatus, and non-transitory computer-readable medium described above may further include processes, features, means, or instructions for transmitting one or more of a SR or feedback information in the uplink data.

A method of wireless communication is described. The method may include allocating uplink common burst symbol resources to a UE for transmission of an uplink common burst symbol, identifying a set of transmission waveforms available for the uplink common burst symbol, each transmission waveform of the set of transmission waveforms associated with different information to be transmitted in the uplink common burst symbol, receiving the uplink common burst symbol from the UE, determining the transmission waveform of the uplink common burst symbol, and determining the information included in the uplink common burst symbol based at least in part on the determined transmission waveform of the uplink common burst symbol.

An apparatus for wireless communication is described. The apparatus may include means for allocating uplink common burst symbol resources to a UE for transmission of an uplink common burst symbol, means for identifying a set of transmission waveforms available for the uplink common burst symbol, each transmission waveform of the set of transmission waveforms associated with different information to be transmitted in the uplink common burst symbol, means for receiving the uplink common burst symbol from the UE, means for determining the transmission waveform of the uplink common burst symbol, and means for determining the information included in the uplink common burst symbol based at least in part on the determined transmission waveform of the uplink common burst symbol.

Another apparatus for wireless communication is described. The apparatus may include a processor, memory in electronic communication with the processor, and instructions stored in the memory. The instructions may be operable to cause the processor to allocate uplink common burst symbol resources to a UE for transmission of an uplink common burst symbol, identify a set of transmission waveforms available for the uplink common burst symbol, each transmission waveform of the set of transmission waveforms associated with different information to be transmitted in the uplink common burst symbol, receive the uplink common burst symbol from the UE, determine the transmission waveform of the uplink common burst symbol, and determine the information included in the uplink common burst symbol based at least in part on the determined transmission waveform of the uplink common burst symbol.

A non-transitory computer-readable medium for wireless communication is described. The non-transitory computer-readable medium may include instructions operable to cause a processor to allocate uplink common burst symbol resources to a UE for transmission of an uplink common burst symbol, identify a set of transmission waveforms available for the uplink common burst symbol, each transmission waveform of the set of transmission waveforms associated with different information to be transmitted in the uplink common burst symbol, receive the uplink common burst symbol from the UE, determine the transmission waveform of the uplink common burst symbol, and determine the information included in the uplink common burst symbol based at least in part on the determined transmission waveform of the uplink common burst symbol.

In some examples of the method, apparatus, and non-transitory computer-readable medium described above, the set of transmission waveforms comprises one or more of a SC-FDM waveform or an OFDM waveform. Some examples of the method, apparatus, and non-transitory computer-readable medium described above may further include processes, features, means, or instructions for configuring the UE to select the SC-FDM waveform when the information to be transmitted in the uplink common burst symbol comprises SRS information, SR information, feedback information associated with a downlink transmission, or combinations thereof, and configuring the UE to select the OFDM waveform when the information to be transmitted in the uplink common burst symbol comprises uplink data.

Some examples of the method, apparatus, and non-transitory computer-readable medium described above may further include processes, features, means, or instructions for configuring the UE to select the SC-FDM waveform for a first subset of a set of frequency resources of the uplink common burst symbol and the OFDM waveform for a second subset of the set of frequency resources of the uplink common burst symbol when the information to be transmitted comprises both uplink data and one or more of SRS information, SR information, or feedback information. In some examples of the method, apparatus, and non-transitory computer-readable medium described above, the set of frequency resources comprises a plurality of frequency tones associated with a plurality of subcarriers used to transmit the uplink common burst symbol, and wherein the first subset of the set of frequency resources and the second subset of the set of frequency resources comprise alternating tones of the plurality of frequency tones.

In some examples of the method, apparatus, and non-transitory computer-readable medium described above, the set of transmission waveforms comprises a subset of SC-FDM waveforms having different sequences, and wherein the transmission waveform of the uplink common burst symbol may be selected from the subset of SC-FDM waveforms based at least in part on the information to be transmitted in the uplink common burst symbol.

In some examples of the method, apparatus, and non-transitory computer-readable medium described above, the information to be transmitted in the uplink common burst symbol comprises one or more of SRS information, SR information, or feedback information associated with a downlink transmission, and wherein the subset of SC-FDM waveforms comprises a plurality of wideband SC-FDM sequences that may be selected based at least in part on which of the SRS information, SR information, feedback information, or combinations thereof, may be transmitted in the uplink common burst symbol. In some examples of the method, apparatus, and non-transitory computer-readable medium described above, the SR information comprises an indication of whether a SR may be present, and the feedback information comprises an acknowledgment indication, a negative acknowledgment indication, or an indication that the feedback information may be not present, and wherein the plurality of wideband SC-FDM sequences comprises different wideband SC-FDM sequences each associated with a different combination of SRS, SR, and the feedback information.

In some examples of the method, apparatus, and non-transitory computer-readable medium described above, the information to be transmitted in the uplink common burst symbol comprises one or more of SRS information, SR information, or feedback information associated with a downlink transmission, and wherein the subset of SC-FDM waveforms comprises a first plurality of wideband SC-FDM sequences and a second plurality of narrowband SC-FDM sequences, and wherein the transmission waveform of the uplink common burst symbol may be selected from the first plurality of wideband SC-FDM sequences when SRS information may be transmitted in the uplink common burst symbol, and the transmission waveform of the uplink common burst symbol may be selected from the second plurality narrowband SC-FDM sequences when no SRS information may be transmitted in the uplink common burst symbol.

In some examples of the method, apparatus, and non-transitory computer-readable medium described above, the determining the transmission waveform of the uplink common burst symbol comprises determining a signal associated with each of a plurality of frequency tones of the received the uplink common burst symbol, correlating the signal associated with each of the plurality of frequency tones with the set of transmission waveforms, and identifying the transmission waveform of the uplink common burst symbol based at least in part on the correlating. In some examples, the determining the information included may be based at least in part on a mapping between the set of transmission waveforms and the different information to be transmitted in the uplink common burst symbol. In some examples, the correlating comprises applying an inverse discrete Fourier transform (IDFT) to the plurality of frequency tones of the received the uplink common burst symbol to generate a time domain sequence, performing a plurality of cyclic shifts on the time domain sequence, each of the plurality of cyclic shifts corresponding to a different transmission waveform of the set of transmission waveforms, and selecting the transmission waveform associated with a cyclic shift of the plurality of cyclic shifts having a highest correlation value.

Some examples of the method, apparatus, and non-transitory computer-readable medium described above may further include processes, features, means, or instructions for filtering the plurality of cyclic shifts based at least in part on a channel estimation associated with a prior transmission of the UE. Some examples of the method, apparatus, and non-transitory computer-readable medium described above may further include processes, features, means, or instructions for performing a channel estimation for the UE based at least in part on the plurality of frequency tones of the received uplink common burst symbol. In some examples, the channel estimation for the UE may be based at least in part on the transmission waveform of the uplink common burst symbol. In some examples of the method, apparatus, and non-transitory computer-readable medium described above, the plurality of cyclic shifts may be selected to provide a subset of frequency tones having a same value irrespective of a cyclic shifts from a base sequence. In some examples of the method, apparatus, and non-transitory computer-readable medium described above, the channel estimation for the UE may be based at least in part on the subset of frequency tones.

Some examples of the method, apparatus, and non-transitory computer-readable medium described above may further include processes, features, means, or instructions for adding two or more time domain samples associated with the subset of frequency tones, and wherein the channel estimation for the UE may be based at least in part on the added time domain samples. Some examples of the method, apparatus, and non-transitory computer-readable medium described above may further include processes, features, means, or instructions for weighting one or more time domain samples associated with the plurality of cyclic shifts, and wherein the channel estimation for the UE may be based at least in part on the weighted time domain samples.

In some examples of the method, apparatus, and non-transitory computer-readable medium described above, the information to be transmitted in the uplink common burst symbol comprises feedback information having M possible states, and wherein the SC-FDM sequences may be selected to provide M equally spaced sequences for M cyclic shifts associated with the M possible states of the feedback information, and wherein a length of the SC-FDM sequences may or may not be a multiple of M.

Some examples of the method, apparatus, and non-transitory computer-readable medium described above may further include processes, features, means, or instructions for coherently combining, based at least in part on the channel estimation, two or more frequency domain samples of the plurality of frequency tones. Some examples may further include processes, features, means, or instructions for coherently combining, based at least in part on the channel estimation, an energy of time domain samples after the IDFT.

In some examples of the method, apparatus, and non-transitory computer-readable medium described above, the information to be transmitted in the uplink common burst symbol comprises uplink data, and wherein the transmission waveform may be selected to be the OFDM waveform for at least a portion of the uplink common burst symbol. In some examples of the method, apparatus, and non-transitory computer-readable medium described above, the information transmitted in the uplink common burst symbol further comprises SRS information, and wherein the determining the information included in the uplink common burst symbol further comprises determining that the information includes SRS information based at least in part on determining that the transmission waveform may be a SC-FDM waveform for a first portion of the uplink common burst symbol, and determining that the information includes the uplink data based at least in part on determining that the transmission waveform may be an OFDM waveform for a second portion of the uplink common burst symbol.

In some examples of the method, apparatus, and non-transitory computer-readable medium described above, the uplink common burst symbol comprises a plurality of frequency tones associated with a plurality of subcarriers used to transmit the uplink common burst symbol, and wherein the first portion of the uplink common burst symbol and the second portion of the uplink common burst symbol comprise alternating tones of the plurality of frequency tones.

Some examples of the method, apparatus, and non-transitory computer-readable medium described above may further include processes, features, means, or instructions for receiving a DMRS in the transmission waveform. In some examples feedback information may be modulated on the DMRS. Some examples of the method, apparatus, and non-transitory computer-readable medium described above may further include processes, features, means, or instructions for identifying a SR or feedback information in the uplink data.

A method of wireless communication is described. The method may include identifying an uplink common burst symbol in a wireless communication subframe for transmission of feedback associated with a downlink transmission in the wireless communication subframe, the uplink common burst symbol having a symbol duration with a beginning portion and an end portion, identifying a sub-matrix of fast Fourier transform (FFT) samples corresponding to the end portion of the symbol duration, identifying a set of vectors associated with the sub-matrix of FFT samples, and formatting the feedback associated with the downlink transmission into the set of vectors.

An apparatus for wireless communication is described. The apparatus may include means for identifying an uplink common burst symbol in a wireless communication subframe for transmission of feedback associated with a downlink transmission in the wireless communication subframe, the uplink common burst symbol having a symbol duration with a beginning portion and an end portion, means for identifying a sub-matrix of FFT samples corresponding to the end portion of the symbol duration, means for identifying a set of vectors associated with the sub-matrix of FFT samples, and means for formatting the feedback associated with the downlink transmission into the set of vectors.

Another apparatus for wireless communication is described. The apparatus may include a processor, memory in electronic communication with the processor, and instructions stored in the memory. The instructions may be operable to cause the processor to identify an uplink common burst symbol in a wireless communication subframe for transmission of feedback associated with a downlink transmission in the wireless communication subframe, the uplink common burst symbol having a symbol duration with a beginning portion and an end portion, identify a sub-matrix of FFT samples corresponding to the end portion of the symbol duration, identify a set of vectors associated with the sub-matrix of FFT samples, and format the feedback associated with the downlink transmission into the set of vectors.

A non-transitory computer-readable medium for wireless communication is described. The non-transitory computer-readable medium may include instructions operable to cause a processor to identify an uplink common burst symbol in a wireless communication subframe for transmission of feedback associated with a downlink transmission in the wireless communication subframe, the uplink common burst symbol having a symbol duration with a beginning portion and an end portion, identify a sub-matrix of FFT samples corresponding to the end portion of the symbol duration, identify a set of vectors associated with the sub-matrix of FFT samples, and format the feedback associated with the downlink transmission into the set of vectors.

Some examples of the method, apparatus, and non-transitory computer-readable medium described above may further include processes, features, means, or instructions for determining, during the beginning portion, the feedback associated with the downlink transmission. Some examples of the method, apparatus, and non-transitory computer-readable medium described above may further include processes, features, means, or instructions for formatting the feedback comprises dropping a cyclic prefix associated with the feedback.

Some examples of the method, apparatus, and non-transitory computer-readable medium described above may further include processes, features, means, or instructions for identifying a different set of vectors associated with the sub-matrix of FFT samples, and formatting a payload associated with the uplink common burst symbol into the different set of vectors.

In some examples of the method, apparatus, and non-transitory computer-readable medium described above, the payload comprises one or more of the feedback associated with the downlink transmission, an SRS or a scheduling request SR.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Additionally or alternatively, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 8 illustrates an example of a fractional cyclic shift in accordance with one or more aspects of the present disclosure.

DETAILED DESCRIPTION

Techniques are described in which uplink common burst transmissions in a subframe may be configured as a single uplink symbol. Next generation networks (e.g., 5G or new radio (NR) networks) are being designed to support features such as high bandwidth operations, more dynamic subframe types, and self-contained subframe types (in which hybrid automatic repeat request (HARQ) feedback for a subframe may be transmitted before the end of the subframe). In self-contained subframes, an uplink common burst symbol may be used at the end of a subframe to transmit various types of information, such as an SRS, a scheduling request (SR), HARQ acknowledgment/negative-acknowledgment (ACK/NACK) information, uplink data, or combinations thereof. The type of information to be provided in the uplink common burst symbol may be used, in some examples, to determine a waveform for the symbol. In some cases, a sequence transmitted in the uplink common burst symbol may be selected to provide ACK/NACK information only in an end portion of the uplink common burst symbol, which may provide additional processing time for a UE to process a downlink transmission and determine the ACK/NACK information.

A waveform for the uplink common burst symbol may be selected to be a single-carrier frequency division multiplexing (SC-FDM) waveform, an OFDM waveform, or combinations thereof, based on information that is to be transmitted in the uplink common burst symbol. The SC-FDM waveform may be selected when an SRS, SR, HARQ feedback, or combinations thereof are to be transmitted. The OFDM waveform may be selected when uplink data is to be transmitted. A mixed waveform may be selected when uplink data and other information is to be transmitted. In some examples, a pattern for SC-FDM sequences may be selected to provide enhanced channel estimation through common pilot tones across different sequences. Additionally, wideband or narrowband SC-FDM sequences may be selected, in some examples, based on information to be transmitted.

Aspects of the disclosure are initially described in the context of a wireless communications system. Aspects of the disclosure are further illustrated by and described with reference to apparatus diagrams, system diagrams, and flowcharts that relate to uplink common burst symbol configuration.

Figure 1:
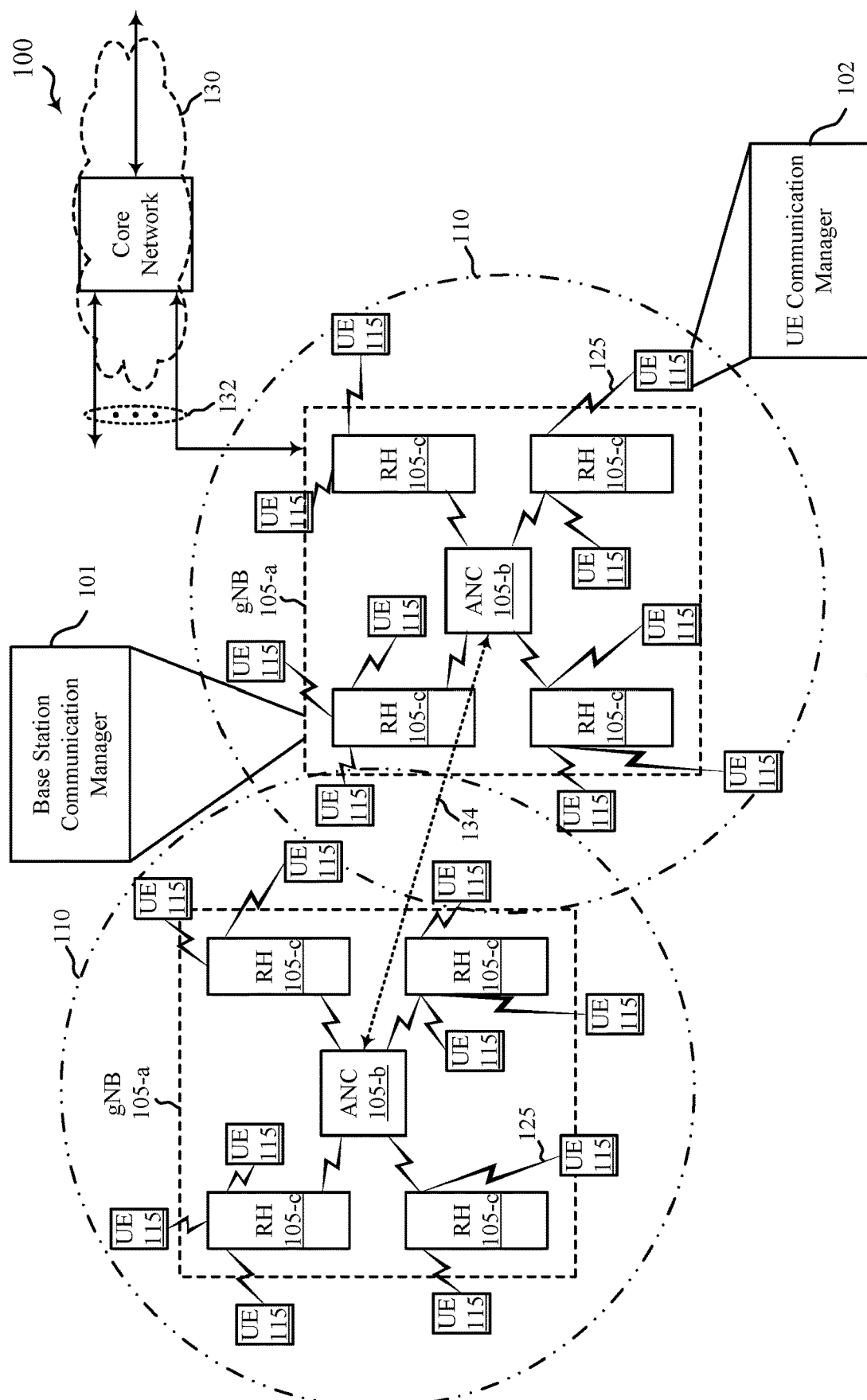
FIG. 1 illustrates an example of a system for wireless communication that supports uplink common burst symbol configuration in accordance with one or more aspects of the present disclosure.

FIG. 1 illustrates an example of a wireless communication system 100, in accordance with one or more aspects of the present disclosure. The wireless communication system 100 may include base stations 105 (e.g., gNodeBs (gNBs), and/or RHs), UEs 115, and a core network 130. In some examples, the wireless communication system 100 may be an LTE, LTE-A network, or an NR network. Wireless communication system 100 may support self-contained subframes in which a waveform for an uplink common burst symbol is selected based on some types of information to be transmitted, such as SRS, SR, HARQ feedback, uplink data, or combinations thereof.

The wireless communication system 100 may include base stations 105, UEs 115, and a core network 130. The core network 130 may provide user authentication, access authorization, tracking, Internet Protocol (IP) connectivity, and other access, routing, or mobility functions. At least some of the base stations 105 (e.g., eNBs 105-a or ANCs 105-b) may interface with the core network 130 through backhaul links 132 (e.g., S1, S2, etc.) and may perform radio configuration and scheduling for communication with the UEs 115. In various examples, the ANCs 105-b may communicate, either directly or indirectly (e.g., through core network 130), with each other over backhaul links 134 (e.g., X1, X2, etc.), which may be wired or wireless communication links. Each ANC 105-b may also communicate with a number of UEs 115 through a number of smart RHs 105-c in a coverage area 110. In an alternative configuration of the wireless communication system 100, the functionality of an ANC 105-b may be provided by a RH 105-c or distributed across the RHs 105-c of an eNB 105-a. In another alternative configuration of the wireless communication system 100, the RHs 105-c may be replaced with base stations, and the ANCs 105-b may be replaced by base station controllers (or links to the core network 130).

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the eNBs 105-a and/or RHs 105-c may have similar frame timing, and transmissions from different eNBs 105-a and/or RHs 105-c may be approximately aligned in time. For asynchronous operation, the eNBs 105-a and/or RHs 105-c may have different frame timings, and transmissions from different eNBs 105-a and/or radio heads 105-c may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a RH 105-c, ANC 105-b, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an Internet of Everything (IoE) device, or the like. A UE may be able to communicate with various types of eNBs 105-a, RHs 105-c, base stations, access points, or other base stations, including macro eNBs, small cell eNBs, relay base stations, and the like. A UE may also be able to communicate directly with other UEs (e.g., using a peer-to-peer (P2P) protocol).

The communication links 125 shown in wireless communication system 100 may include UL channels from a UE 115 to a RH 105-c, and/or DL channels, from a RH 105-c to a UE 115. The DL channels may also be called forward link channels, while the UL channels may also be called reverse link channels. Control information and data may be multiplexed on a UL channel or DL channel according to various techniques. Control information and data may be multiplexed on a DL channel, for example, using time-division multiplexing (TDM) techniques, frequency-division multiplexing (FDM) techniques, or hybrid TDM-FDM techniques.

One or more of the base stations 105 (e.g., one or more eNBs 105-a) may include a base station wireless communication manager 101. In some examples, the base station wireless communication manager 101 may be an example of the base station communications manager 1815 described with reference to FIGS. 15-18, and may be used to identify a set of transmission waveforms available for an uplink common burst symbol, with each transmission waveform of the set of transmission waveforms associated with different information to be transmitted in the uplink common burst symbol. The base station wireless communication manager 101 may also be used to receive the uplink common burst symbol from a UE 115, determine the transmission waveform of the uplink common burst symbol, and determine the information included in the uplink common burst symbol based at least in part on the determined transmission waveform of the uplink common burst symbol.

One or more of the UEs 115 may include a UE wireless communication manager 102. In some examples, the UE wireless communication manager 102 may be an example of the UE communications manager 1415 described with reference to FIGS. 11-14, and may be used to select a transmission waveform for the uplink common burst symbol based at least in part on the information to be transmitted in the uplink common burst symbol. The UE wireless communication manager 102 may also be used to determine feedback information (e.g., HARQ ACK/NACK feedback) and identify a sequence for transmission of the feedback information such that the feedback information is located in an end portion of the uplink common burst symbol.

Each communication link 125 may include one or more carriers, where each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using FDD techniques (e.g., using paired spectrum resources) or TDD techniques (e.g., using unpaired spectrum resources). Frame structures for FDD (e.g., frame structure type 1) and TDD (e.g., frame structure type 2) may be defined.

In some examples of the wireless communication system 100, the RHs 105-c and/or UEs 115 may include multiple antennas for employing antenna diversity schemes to improve communication quality and reliability between RHs 105-c and UEs 115. Additionally or alternatively, RHs 105-c and/or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple DL CCs and one or more UL CCs CA. CA may be used with both FDD and TDD CCs.

Figure 2:
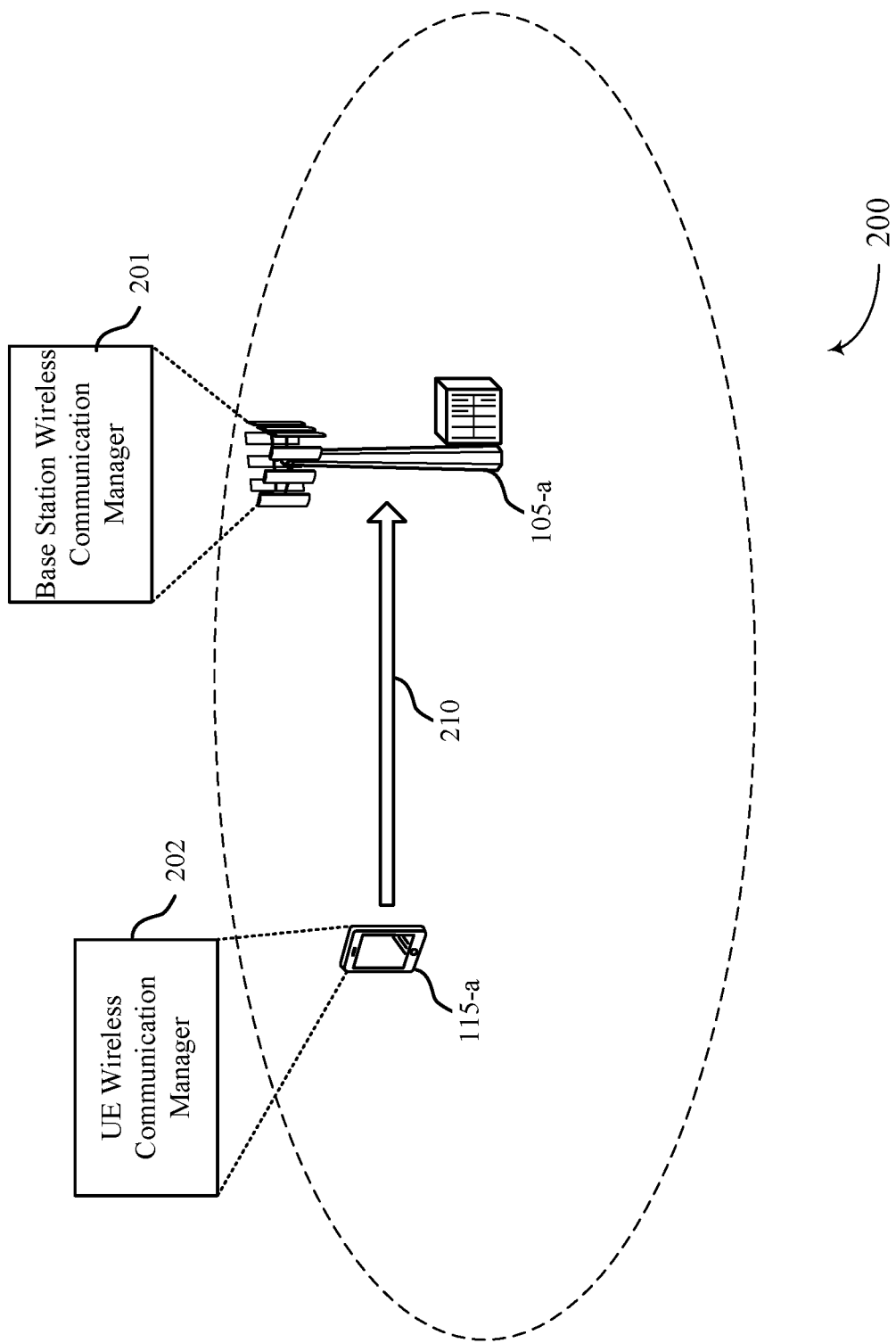
FIG. 2 illustrates an example of a wireless communications system that supports uplink common burst symbol configuration in accordance with one or more aspects of the present disclosure.

FIG. 2 illustrates an example of a wireless communications system 200 for uplink common burst symbol configuration in accordance with one or more aspects of the present disclosure. Wireless communications system 200 may include base station 105-a, and UE 115-a, which may be examples of the corresponding devices described with reference to FIG. 1. Wireless communications system 200 may use a communications configuration that includes uplink-centric subframes and downlink-centric subframes that include an uplink common burst symbol that is transmitted in an uplink transmission 210.

As indicated above, an uplink common burst symbol may include various types of information, such as an SRS, SR, feedback information, uplink data, or any combination thereof. In some cases, an uplink common burst transmission 210 may be split into two half-symbols, in which each split symbol has double tone spacing and a half cyclic prefix (CP) length. In such examples, the first half symbol may be used for SRS and SR, and the second half symbols may be used for feedback information and uplink data (e.g., physical uplink shared channel (PUSCH) data). In such cases, the UE 115-a may use the first half symbol as additional turnaround time during which the feedback information may be determined. Various aspects of the present disclosure provide an uplink common burst transmission 210 that includes a one-symbol design. Such a one-symbol design may allow for a normal CP to be used, which may provide enhanced interference mitigation and increase the likelihood of successful reception of the uplink burst transmission 210. Various aspects of the disclosure additionally or alternatively provide techniques for waveform selection and sequence selection that may support multiplexing and information transmission using SC-FDM and OFDM waveforms. For example, a SC-FDM sequence may be used for transmission of one or more of SRS, SR, or feedback information, and an OFDM waveform may be used for transmission of uplink data. Additionally, in some examples, sequences may be provided to allow the UE 115-a to provide feedback information in an end portion of the uplink burst symbol (e.g., in a second half of the uplink burst symbol), which may allow the UE 115-a to use a beginning portion of the uplink burst symbol to process downlink transmissions, determine the feedback, and format the feedback for transmission.

The base station 105-a may include a base station wireless communication manager 201, which may be an example of base station wireless communication manager 101 of FIG. 1, and may be used to identify a set of transmission waveforms available for an uplink common burst symbol, with each transmission waveform of the set of transmission waveforms associated with different information to be transmitted in the uplink common burst symbol. The base station wireless communication manager 201 may additionally or alternatively be used to receive the uplink common burst symbol in uplink transmission 210 from UE 115-a, determine the transmission waveform of the uplink common burst symbol, and determine the information included in the uplink common burst symbol based at least in part on the determined transmission waveform of the uplink common burst symbol.

The UE 115-a may include a UE wireless communication manager 202, which may be an example of UE wireless communication manager 102 of FIG. 1, and may be used to select a transmission waveform for the uplink common burst symbol based at least in part on the information to be transmitted in the uplink common burst symbol. The UE wireless communication manager 202 may additionally or alternatively be used to determine feedback information (e.g., HARQ ACK/NACK feedback) and identify a sequence for transmission of the feedback information such that the feedback information is located in an end portion of the uplink common burst symbol.

Figure 3A:
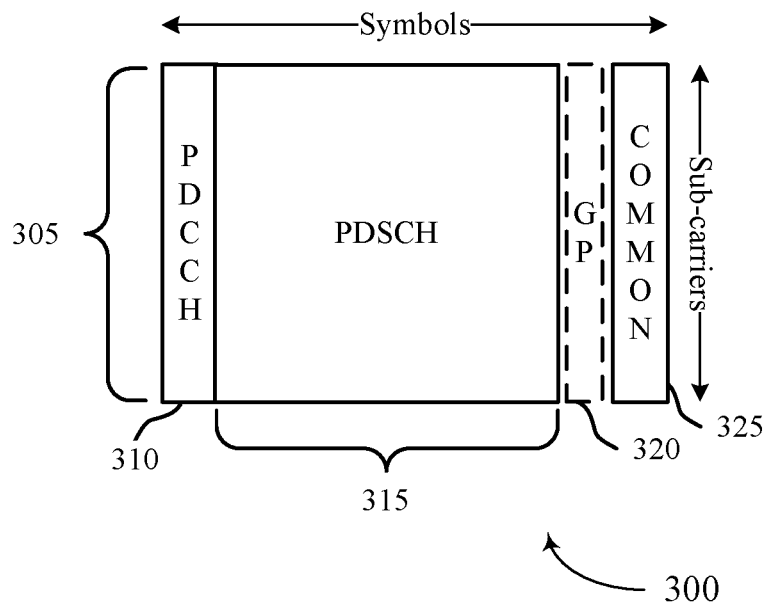
FIG. 3A illustrates an example of a subframe associated with a DL-centric dynamic subframe type that supports uplink common burst symbol configuration in accordance with one or more aspects of the present disclosure.

FIG. 3A illustrates an example of a subframe associated with a DL-centric dynamic subframe type 300 in accordance with one or more aspects of the present disclosure. In some examples, the DL-centric dynamic subframe type may be selected for the subframe 305, by a base station such as a base station 105 of FIGS. 1-2, based at least in part on a UL/DL traffic ratio. For example, a base station may select a DL-centric dynamic subframe type for the subframe 305 when the UL/DL traffic ratio that indicates more traffic is queued by the base station for transmission to one or more UEs that is queued by the one or more UEs for transmission to the base station. In some examples, the base stations and UEs that communicate in the subframe 305 may be examples of aspects of the base stations 105 and UEs 115 described with reference to FIGS. 1-2.

The subframe 305 may begin with a DL control region 310, which may be transmitted in a physical downlink control channel (PDCCH) in one or more symbols of subframe 305. Following the DL control region 310, the base station may schedule a data region 315, which may include physical downlink shared channel (PDSCH) transmissions. Following the data region 315, a guard period 320 may be provided to allow the UE to perform radio frequency (RF) switching from downlink receptions to uplink transmissions. Following the guard period 320, an uplink common burst symbol 325 may be scheduled for transmission by the UE of information such as SRS, SR, feedback (e.g., ACK/NACK information), or uplink data. Such an uplink common burst symbol 325 may allow for a self-contained subframe 305, in which feedback on successful reception of data in the data region 315 may be provided within the same subframe, which may provide for lower latency and enhanced data throughput relative to providing feedback information in some number of subframes after the data region 315. To the base station.

Figure 3B:
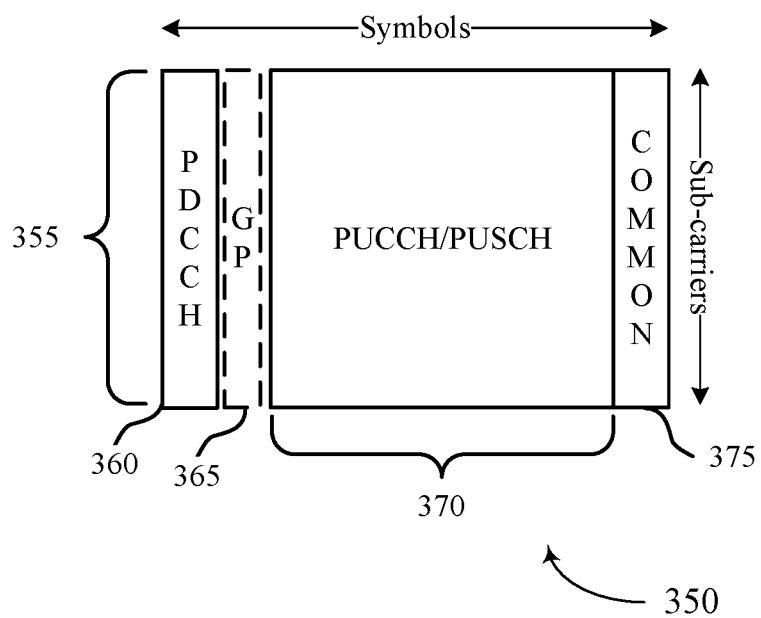
FIG. 3B illustrates an example of a subframe associated with a UL-centric dynamic subframe type that supports uplink common burst symbol configuration in accordance with one or more aspects of the present disclosure.

FIG. 3B illustrates an example of a subframe associated with a UL-centric dynamic subframe type 350 in accordance with one or more aspects of the present disclosure. In some examples, the UL-centric dynamic subframe type may be selected for the subframe 355, by a base station such as a base station 105 of FIGS. 1-2, based at least in part on a UL/DL traffic ratio. For example, a base station may select a UL-centric dynamic subframe type for the subframe 355 when the UL/DL traffic ratio that indicates more traffic is queued by the UE for transmission than is queued by the base station for transmission to the UE. In some examples, the base stations and UEs that communicate in the subframe 355 may be examples of aspects of the base stations 105 and UEs 115 described with reference to FIGS. 1-2.

The subframe 355 may begin with a DL control region 360, which may be transmitted in a PDCCH transmission in one or more symbols of subframe 355. Following the DL control region 360, a guard period 365 may be provided to allow the UE to perform RF switching from downlink receptions to uplink transmissions. Following the guard period 365, the base station may schedule a data region 370, which may include PUSCH transmissions and/or physical uplink control channel (PUCCH) transmission. Following the data region 370, an uplink common burst symbol 375 may be scheduled for transmission by the UE of information such as SRS, SR, or uplink data.

As indicated above, the uplink common burst symbol 325 of FIG. 3A and uplink common burst symbol 375 of FIG. 3B may be a single symbol that is transmitted by a UE to provide various types of information to the base station. In order to convey information to a base station, a UE may select a waveform for the uplink common burst symbol 325 and uplink common burst symbol 375 based on the type of information to be transmitted. In some examples, a SC-FDM waveform may be selected when SRS, SR, feedback information, or combinations thereof are to be transmitted. Additionally, in some examples, an OFDM waveform may be selected when uplink data is to be transmitted. In some cases, where both uplink data and one or more of SRS, SR, or feedback information are to be provided, a mixed SC-FDM and OFDM waveform may be used for the uplink common burst symbol 325 and uplink common burst symbol 375.

A UE, for example, may be configured by a base station to select a waveform based on the information to be provided in the uplink common burst symbol 325 and uplink common burst symbol 375. In some examples, when SRS, SR, or feedback information are to be provided, a base station may configure the UE to use some sequences in the SC-FDM waveform to indicate the transmitted information. For example, if the UE is to provide SRS transmissions, a wideband transmission may be desirable in order to provide sufficient SRS information to the base station. However, if only SR or feedback information are to be provided, a wideband transmission may not be necessary, as sufficient information may be communicated in a narrowband transmission. In some examples, a wideband transmission may use subcarriers that span an entire transmission bandwidth (e.g., 80 MHz) for communications between the base station and UE, and a narrowband transmission may use subcarriers that span only a portion (e.g., 20 MHz) of the transmission bandwidth.

In cases where wideband transmissions are used to convey information in the uplink common burst symbol, a number of predetermined sequences may be provided that may be detected by the base station and used to determine the information conveyed. Table 1 below provides one example of different SC-FDM wideband sequences that may be used to convey some types of information. For example, SRS may be used for channel estimation by the base station, and the base station may monitor for transmissions across the wideband transmission bandwidth. SR information may include a zero if no SR is present, or a one if there is a SR from the UE. Feedback information may include a one to indicate ACK of a downlink transmission, a negative-one to indicate NACK of the downlink transmission, or discontinuous transmission (DTX) if feedback is not being provided (e.g., if the UE missed a grant of feedback resources). In the example of Table 1, six different sequences may be provided for the SC-FDM waveform, and the base station, upon detecting the particular transmitted sequence, may determine the information transmitted by the UE.

In the example of Table 1, when the information to be transmitted is SR+ACK, a sequence five may alternatively be added when DTX and SR includes one. In one example, when the information to be transmitted is SRS+SR+ACK, a sequence three and a sequence six may be removed if DTX detection is not required at the receiver side. In such an example, the number of sequences may be four. In some cases, when DTX detection is not required at the receiver side, the sequence corresponding to NACK(ACK=negative one) will be transmitted when DTX at the transmitter side. In another example, there may be two bits of ACK information. In one example, the number of sequences may be four for ACK only transmission, and eight for ACK+SR transmission without DTX detection, when SR is one. In such example, the number of sequences may be nine for ACK+SR transmission with DTX detection, when SR is one. In one example, the number of sequences may be eight for SRS+SR+ACK if DTX detection is not required at the receiver side, and the number of sequences may be ten if DTX detection is required at the receiver side.

TABLE 1

SC-FDM Wideband Sequences

| Information to be transmitted | UE transmission | Base Station |
|---|---|---|
| SRS only | Always transmit sequence 1 | Channel estimation |
| SR only | Transmit Sequence 1 if SR = 1, nothing if SR = 0 | On-off detection |
| ACK only | Transmit Sequence 1 if ACK = −1, or sequence 2 if ACK = 1, nothing if DTX | Sequence 1, 2 or off detection |
| SRS + SR | Transmit Sequence 1 if SR = 0, or sequence 2 if SR = 1 | sequence 1 or 2 detection |
| SRS + ACK | Transmit Sequence 1 if ACK = −1, sequence 2 if ACK = 1, and sequence 3 if DTX | Sequence 1, 2, and 3 detection |
| SR + ACK | Transmit sequence 1 if ACK = −1&SR = 0, sequence 2 if ACK = 1&SR = 0, sequence 3 if ACK = −1&SR = 1, sequence 4 if ACK = 1&SR = 1, nothing if DTX and SR = 0 | Sequence 1, 2, 3, 4 and off detection |
| SRS + SR + ACK | Transmit sequence 1 if ACK = −1&SR = 0, sequence 2 if ACK = 1&SR = 0, sequence 3 if ACK = −1&SR = 1, sequence 4 if DTX and SR = 0, sequence 5 if ACK = −1&SR = 1, sequence 6 if ACK = 1&SR = 1 if DTX&SR = 1 | Sequence 1, 2, 3, 4, 5, 6 detection |

TABLE 1-continued

SC-FDM Wideband Sequences

| Information to be transmitted | UE transmission | Base Station |
|---|---|---|

In other examples, one or more narrowband transmissions may be used to convey information in an uplink common burst symbol. Such differences in bandwidth for transmissions may, in some examples, be used as an indicator of whether the UE is transmitting SRS or not. Table 2 below provides one example of different SC-FDM wideband and narrowband sequences that may be used to convey some types of information. For example, SRS may be used for channel estimation by the base station, and the base station may monitor for transmissions across the wideband transmission bandwidth, which may indicate the presence of SRS. If no SRS is transmitted, SR and feedback information may be transmitted using narrowband SC-FDM sequences. Similarly as discussed above, SR information may include a zero if no SR is present, or a one if there is a SR from the UE. Feedback information may include a one to indicate ACK of a downlink transmission, a negative-one to indicate NACK of the downlink transmission, or DTX if feedback is not being provided (e.g., if the UE missed a grant of feedback resources). In the example of Table 2, four different narrowband SC-FDM sequences, and six different wideband SC-FDM sequences may be provided for the SC-FDM waveform, and the base station, upon detecting the particular transmitted sequence, may determine the information transmitted by the UE. Narrow band resource can be different sequences in the same frequency band or the same sequences in different frequency band.

In an example where SR+ACK is included in the information to be transmitted, a narrow band sequence N5 may alternatively be added when DTX and SR is one. In the example, wherein SRS+SR+ACK is included in the information to be transmitted, a sequence W3 and a sequence W6 may be removed if DTX detection is not required at the receiver side. In such a case, the number of sequences may be four. In some examples, when DTX detection is not required at the receiver side, the sequence corresponding to NACK(ACK=negative one) may be transmitted when DTX at the transmitter side. In another example, there may be two bits of ACK information. In some examples, for ACK only transmission, the number of sequences may be four. In some examples, for ACK+SR transmission without DTX detection when SR=one, the number of sequences may be eight. In some examples, for ACK+SR transmission with DTX detection when SR=one, the number of sequences may be nine. In some examples, for SRS+SR+ACK if DTX detection is not required at the receiver side, the number of sequences may be eight. In some examples, for SRS+SR+ACK if DTX detection is required at the receiver side, the number of sequences may be ten.

TABLE 2

SC-FDM Narrowband and Wideband Sequences

| Information to be transmitted | UE transmission | Base Station |
|---|---|---|
| SRS only | Always transmit wideband sequence W1 | Channel estimation |
| SR only | Transmit narrowband resource N1 if SR = 1 | On-off detection |
| ACK only | Transmit narrowband resource N1 if ACK = −1, or narrowband resource N2 if ACK = 1 | narrowband resource N1, N2 or off detection |
| SRS + SR | Transmit wideband Sequence W1 if SR = 0, or wideband sequence W2 if SR = 1 | wideband sequence W1 or W2 detection |
| SRS + ACK | Transmit wideband Sequence W1 if ACK = −1, sequence W2 if ACK = 1, and sequence W3 if DTX | WB Sequence W1, W2, and W3 detection |
| SR + ACK | Transmit narrowband resource 1 if ACK = −1&SR = 0, resource 2 if ACK = 1&SR = 0, resource 3 if ACK = −1&SR = 1, resource 4 if ACK = 1&SR = 1, nothing if DTX and SR = 0 | Narrowband resource N1, N2, N3, N4 and off detection |
| SRS + SR + ACK | Transmit wideband sequence 1 if ACK = −1&SR = 0, wideband sequence 2 if ACK = 1&SR = 0, wideband sequence 3 if DTX and SR = 0, wideband sequence 4 if ACK = −1&SR = 1, wideband sequence 5 if ACK = 1&SR = 1, wideband sequence 6 if DTX&SR = 1 | Wideband Sequence W1, W2, W3, W4, W5, W6 detection |

The particular sequence transmitted by a UE may be detected at the base station. In some examples, the transmitted sequences are configured to allow for sequence detection through cyclic shifts applied to a received transmission. Cyclic shifts may be accomplished at the base station by, for example, configuring an IDFT to transform the received uplink common burst symbol from the frequency domain to the time domain and selecting different taps of the IDFT output to provide different cyclic shifts from a base sequence.

Figure 4:
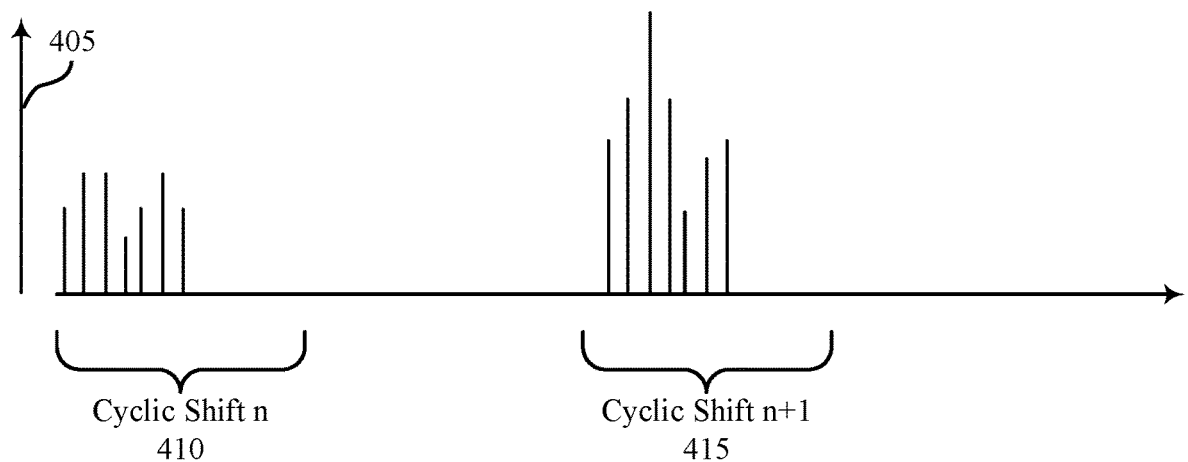
FIG. 4 illustrates an example of sequence detection using cyclic shifts in accordance with one or more aspects of the present disclosure.

FIG. 4 illustrates an example of a sequence detection using cyclic shifts 400 for uplink common burst symbol configuration in accordance with one or more aspects of the present disclosure. In some examples, the base stations and UEs that communicate using the sequences may be examples of aspects of the base stations 105 and UEs 115 described with reference to FIGS. 1-2.

In the example of FIG. 4, the base station may use energy detection, in which an energy 405 may be detected for different hypotheses for the received sequence, with a hypothesis with the highest energy selected as the detected sequence. In FIG. 4, a first cyclic shift (cyclic shift n) and 410 a second cyclic shift (cyclic shift n+1) 415 may be applied to the received transmission. While the example of FIG. 4 shows cyclic shifts n and n+1, the values of the cyclic shifts can be any numbers, that are not necessarily consecutive. The hypotheses may use frequency domain correlation with a base sequence and IDFT to time domain, in which different hypothesis may be on different taps of the IDFT component. An energy of each tap for each hypothesis may be added, and the hypothesis with the highest energy may be identified at the detected sequence. In some examples, the base station may use history and filtering to improve time domain estimation, and channel estimation based on the detected sequence may be used for future filtering.

Figure 5:
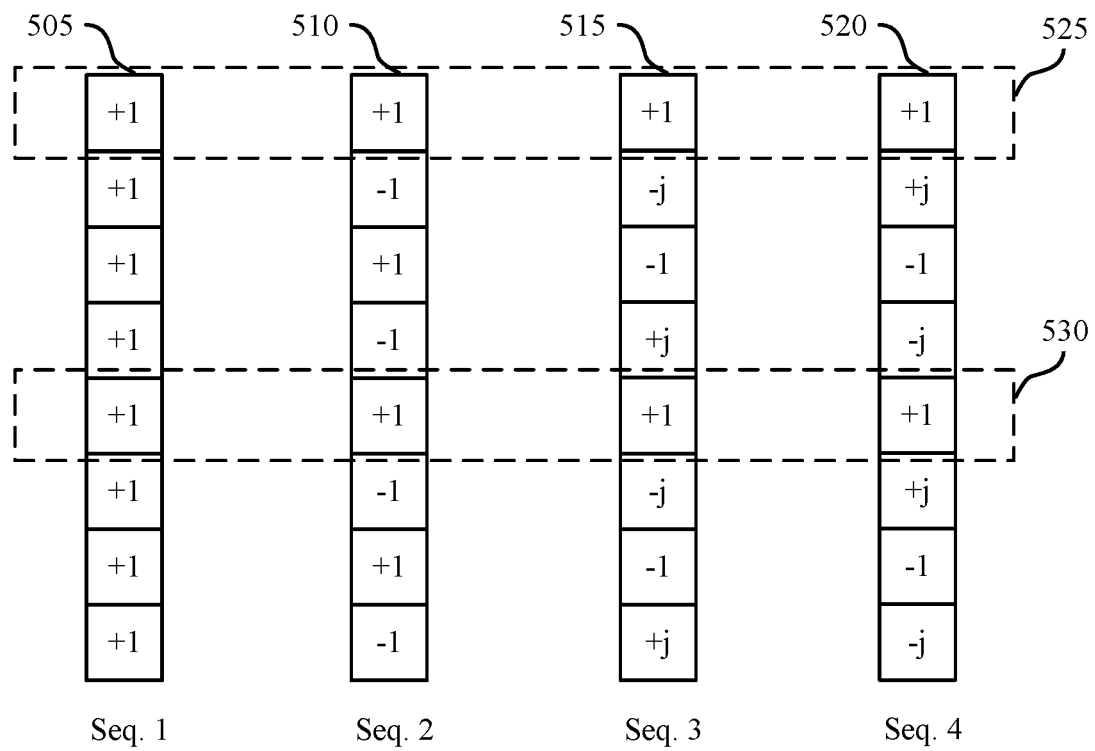
FIG. 5 illustrates an example of SC-FDM sequences that in accordance with one or more aspects of the present disclosure.

As indicated above, different sequences may be used to indicate transmitted information in an uplink common burst symbol. FIG. 5 illustrates an example of a SC-FDM sequences 500 for uplink common burst symbol configuration in accordance with one or more aspects of the present disclosure. SC-FDM sequences may be used for uplink common burst transmissions between UEs 115 and base stations 105 of FIGS. 1 and 2, for example. In this example, a first sequence 505 may be a base sequence in the frequency domain. A second sequence 510 may correspond to an N/2 (where N is the sequence length) cyclic shift. In another example, the first sequence may use a first cyclic shift between 0 and N−1, the second sequence may use a second cyclic shift as the first cyclic shift+N/2, modulated by N. Such an N/2 cyclic shift in the time domain leads to sign alternative flipping in the frequency domain, as indicated in FIG. 5. Thus, for hypothesis testing with two sequences, the transmission is essentially a coherent transmission, and every other tone is known pilot. In cases where four sequences may be tested a third sequence 515 and a fourth sequence 520 may correspond to N/4 cyclic shifts of the base sequence 505. For example, the two sequences may use the cyclic shifts X, (X+N/4) mod N, (X +N/2) mod N, and (X+3N/4) mod N, where the first cyclic shift X may be any number between 0 and N−1. Thus, in the case of 4 sequences, every four tones in the frequency domain may provide a known pilot, such as a first known pilot 525 and a second known pilot 530 in FIG. 5. While cyclic shifts distance of N/2 and N/4 are illustrated in FIG. 5, such properties may additionally or alternatively be applied to other cyclic shift distance of N/M, where M is the number of sequences, and every M tones in the frequency domain may be usable as a pilot.

Such common pilot tones may be used for channel estimation, even in the event that the wrong hypothesis is selected. Such a channel estimation may provide for enhanced sequence detection, and a base station may estimate a channel based on known pilot which can serve as reference. For example, a base station may estimate the uplink channel used for the uplink common burst symbol with the identified pilot tones only. Such an estimation may include performing an FFT on the received signal, extracting N/M pilot tones in the frequency domain, performing an IDFT with size N/M, windowing and thresholding the IDFT output, and performing a discrete Fourier transform (DFT) with size N. For two sequences, the channel may be estimate using every other tone and then the other tones demodulated based on the channel estimate. For four, the channel may be estimated using every fourth tones (e.g., first known pilot 525 and second known pilot 530 of FIG. 5). The base station may perform coherent combining of blocks of four tones in frequency domain based on the estimated channel, and then perform an IDFT with size 4, and may identify a detected sequence based on the highest tap output of the IDFT.

Figure 6:
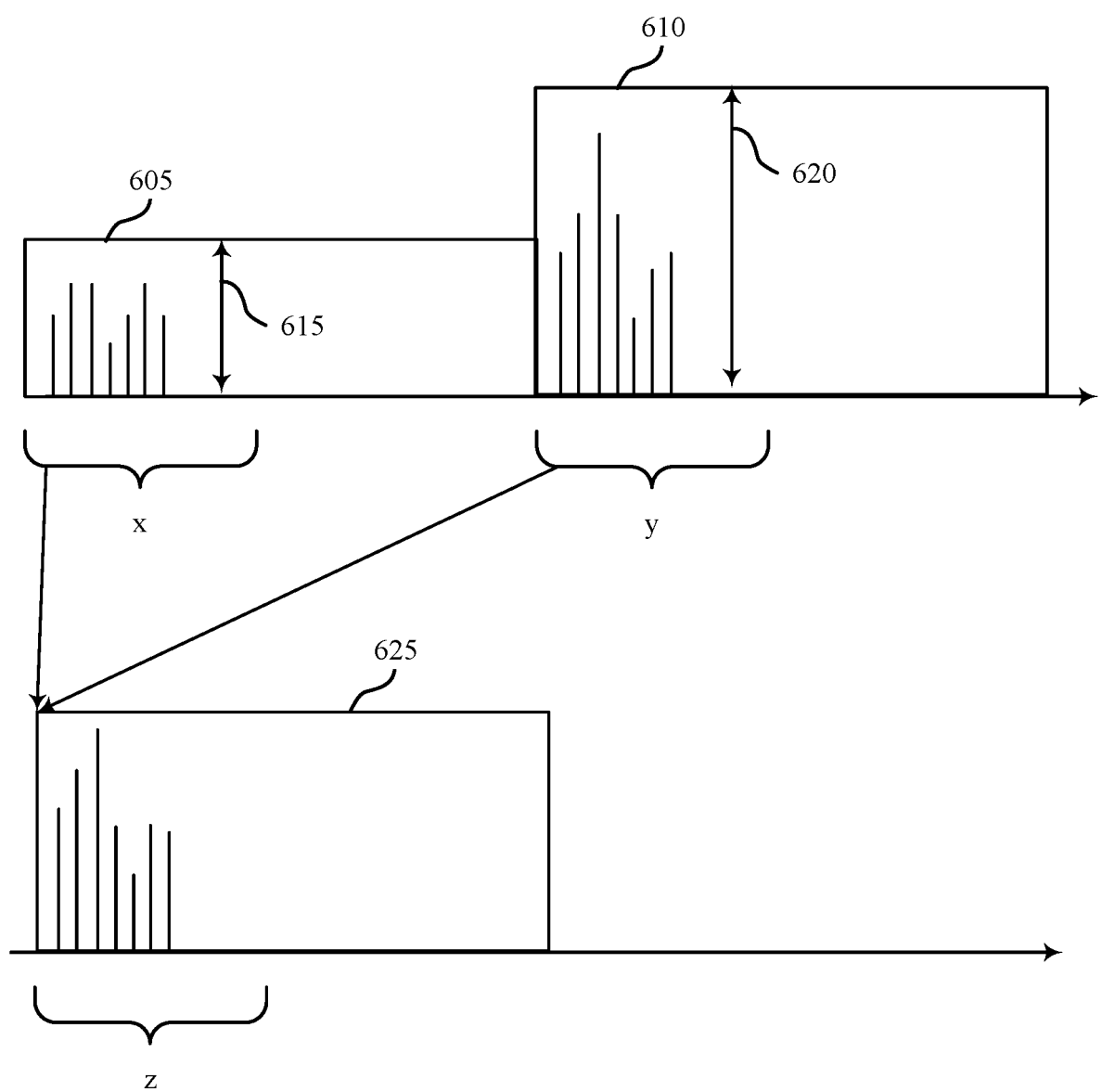
FIG. 6 illustrates an example of channel estimation in an uplink common burst symbol in accordance with one or more aspects of the present disclosure.

In some examples, time domain folding may be used for channel estimation and enhanced sequence detection. FIG. 6 illustrates an example of a channel estimation 600 using time domain folding in accordance with one or more aspects of the present disclosure. Channel estimation 600 may be used for uplink common burst transmissions between UEs 115 and base stations 105 of FIGS. 1 and 2, for example. In this example, a first group of taps 605 and a second group of taps 610 may output time domain samples. Time domain folding may be used to enhance sequence detection. In this example, a base station may receive an uplink common burst transmission and perform an FFT on the received signal, and extract all N usable tones. The base station may perform an IDFT with size N, perform timing domain folding to N/M taps, perform windowing and thresholding, add zero padding to N taps, and then perform a DFT with size N. The block of M tones can be coherently combined with the estimated channel followed by an IDFT of size M and the hypothesis with the highest combined tap energy identified as the detected sequence. The time domain folding may be accomplished, for example, by splitting the N IDFT taps in to N/M groups, and adding the same taps in each group. Such adding may result in increased noise due to the addition of the taps and preserved resolution. In some examples, different weights may be used when adding groups. For example, the first group of taps 605($x$) may have a first weight 615 ($\alpha$), and the second group of taps 610($y$) may have a second weight 620 ($\beta$). The added group 625($z$) may have computed tap values based on the weights, such that $z_i = \alpha x_i + \beta y_i$. If equal weights are provided to the first group of taps 605 and the second group of taps 610, then both $\alpha$ and $\beta$ may equal one. If one group is trusted more than another group, such as if the second group of taps 610 are trusted more, then $\beta$ may be greater than one and/or $\alpha$ may be less than one. Of course, while only two groups of taps are illustrated, it will be readily understood that any number of groups of taps may be used.

Figure 7:
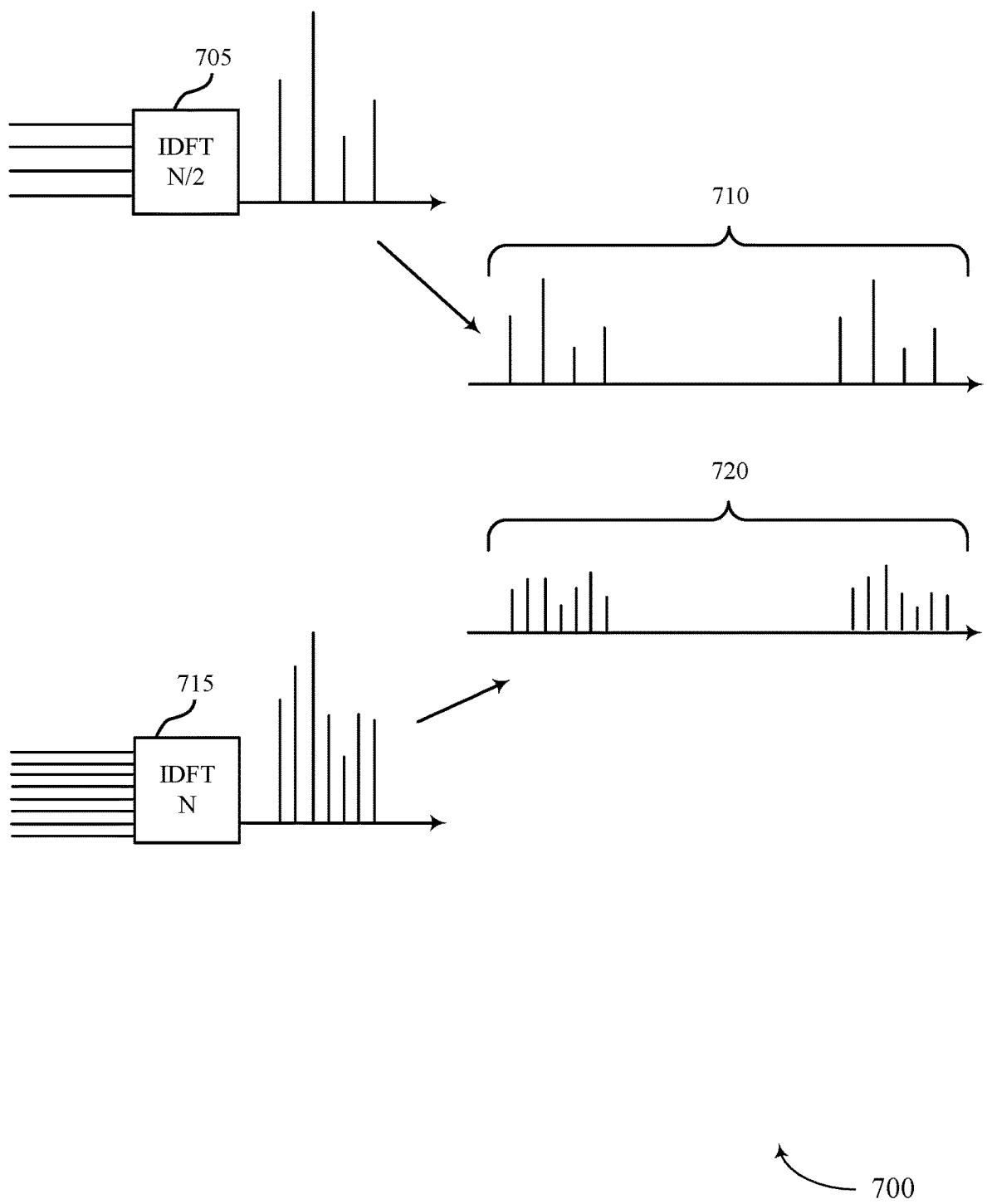
FIG. 7 illustrates an example of coherent energy combining in an uplink common burst symbol in accordance with one or more aspects of the present disclosure.

In some examples, coherent energy combining may be used for channel estimation and enhanced sequence detection. FIG. 7 illustrates an example of a coherent energy combining 700 for an uplink common burst symbol in accordance with one or more aspects of the present disclosure. Coherent energy combining 700 may be used for uplink common burst transmissions between UEs 115 and base stations 105 of FIGS. 1 and 2, for example. In this example, an IDFT of N/2 705 may be applied to a received transmission, which may provide tap outputs 710. An IDFT of N 715 may be applied to the received transmission which may provide tap outputs 720, and a time domain channel may be estimated in a similar manner as discussed above with respect to FIGS. 5-6. The energy of each of the tap outputs 720 may then be weighted by the estimated channel before combining. Such coherent combining may provide processing gains relative to techniques that do not use coherent combining.

FIG. 8 illustrates an example of a fractional shift 800 for an uplink common burst symbol in accordance with one or more aspects of the present disclosure. As discussed above, in some examples feedback information may include an ACK/NACK indication, as well as a DTX indication. Thus, three sequences are needed to indicate the feedback information. In the example of FIG. 8, a first sequence 805 may be a base sequence, a second sequence 810 may have a N/3 shift applied in the frequency domain, and a third sequence 815 may have a 2N/3 shift applied in the frequency domain (e.g., equivalent to DFT3 spreading). Such shifts applied in the frequency domain results in a time domain signal that has fractional shifts (e.g., a sequence length N of 16, with three hypotheses results in a 16/3 shift, which is not an integer shift in the time domain). Thus, such a sequence selection provides for a maximal and equal distance for the three hypotheses and, for three sequences, every three tones is a DFT3 matrix and has one known pilot. While three sequences are illustrated in FIG. 8, such techniques may be used for any sequence length and any number of sequences.

Figure 9:
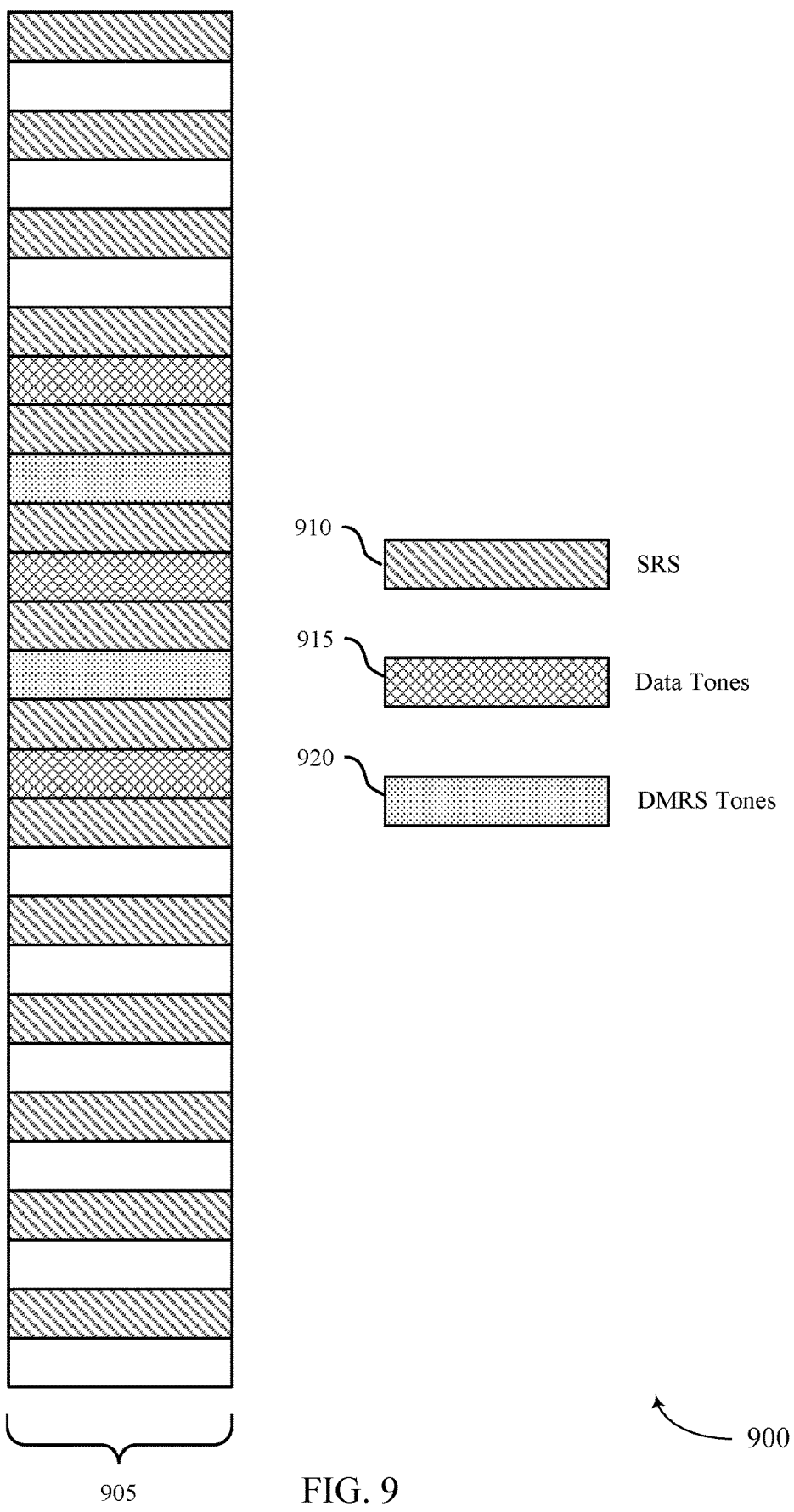
FIG. 9 illustrates an example of a mixed waveform in an uplink common burst symbol in accordance with one or more aspects of the present disclosure.

In cases where uplink data is to be provided, as discussed above, and OFDM waveform may be used for the uplink common burst symbol transmission. In cases where uplink data and SRS, SR, or feedback information is to be provided, a mixed SC-FDM and OFDM waveform may be used. FIG. 9 illustrates an example of a mixed waveform in an uplink common burst symbol 900 in accordance with one or more aspects of the present disclosure. Uplink common burst symbol 900 may be used for uplink common burst transmissions between UEs 115 and base stations 105 of FIGS. 1 and 2, for example. In this example, uplink common burst symbol 900 may include a number of tones 905. In this example, even tones may support wideband sequence transmissions as discussed above with respect to FIGS. 2-8. Odd tones of the number of tones 905 may be transmitted using an OFDM waveform, to transmit uplink data. The OFDM waveform may include data tones 915 and DMRS tones 920, in this example. If no SRS is to be transmitted in the uplink common burst symbol 900, data tones 915 may be transmitted on assigned odd tones, such as a narrowband transmission as indicated in FIG. 9. DMRS tones 920 may be used by the base station for demodulation, and may include SR information in the payload. If SRS is to be transmitted in the uplink common burst symbol 900, the UE may transmit SRS tones 910 on even tones. The base station may additionally or alternatively use the SRS tones 910 to estimate the uplink channel, as discussed above. In such cases, DMRS may or may not be needed, and may be transmitted based on a configuration provided to the UE by the base station. While the example of FIG. 9 shows SRS tones 910 on even tones, and data tones 915 and DMRS tones 920 on odd tones, such a configuration is exemplary only, and other frequency resources may contain the different tones. Furthermore, in some examples, SR information may be transmitted in a data payload of a data tone 915 if data is present, and feedback information may be transmitted in the data payload or modulated on DMRS.

Figure 10:
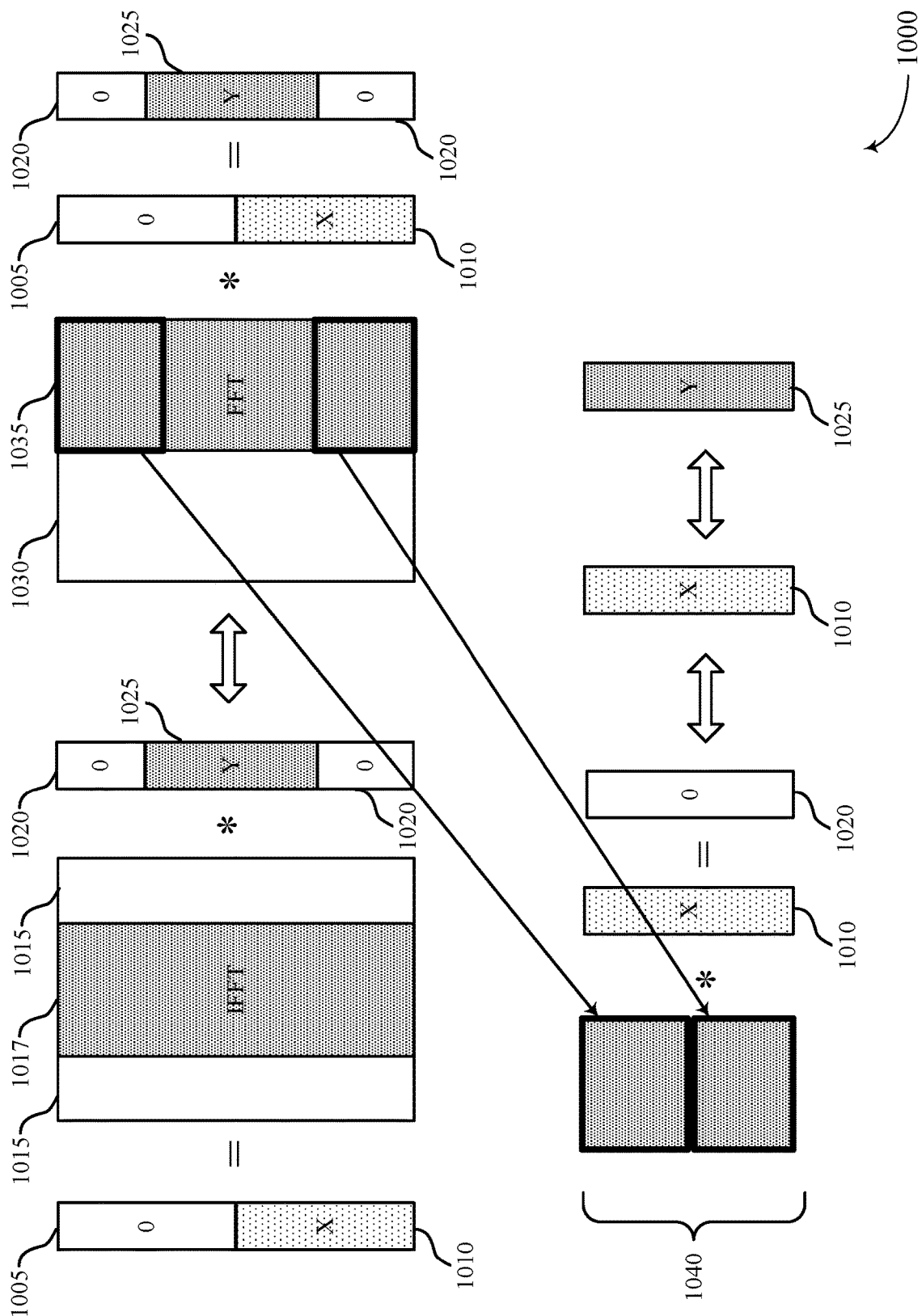
FIG. 10 illustrates an example of a sequence determination that provides information in an end portion of a symbol in accordance with one or more aspects of the present disclosure.

As discussed above, use of a single symbol in the uplink common burst symbol may provide processing challenges to a UE that may need to determine feedback information for a downlink transmission prior to transmitting the uplink common burst symbol. FIG. 10 illustrates an example of a sequence determination 1000 that provides information in an end portion of a symbol in accordance with one or more aspects of the present disclosure. Sequence determination 1000 may be used for uplink common burst transmissions between UEs 115 and base stations 105 of FIGS. 1 and 2, for example. In this example, a UE may not be capable of providing feedback information in an uplink common burst symbol based on timing constraints associated with the start of transmissions of the uplink common burst symbol. Using the sequence determination 1000, a sequence may be identified that creates zeros in the beginning portion of the uplink common burst symbol, and that provides for feedback information to be transmitted in the end portion of the uplink common burst symbol. Such a technique may allow the UE to complete processing and generate feedback information that may be provided in the uplink common burst symbol. In some examples, the use of such a sequence may be configured by a base station based on a capability of the UE. In some examples, the UE may identify a sub-matrix of FFT samples corresponding to an end portion of the symbol duration, identify a set of vectors associated with the sub-matrix of FFT samples, and formatting the feedback associated with the downlink transmission into the set of vectors.

The sequence may be determined, in the example of FIG. 10, by identifying that the beginning portion of the uplink common burst symbol (N/2 in this example) is to include time domain samples that are zeros 1005, and that the end portion of the uplink common burst symbol is to include time domain samples that include feedback information 1010. Such a configuration time domain samples that zeros 1005 and feedback information 1010 may be the result of an inverse fast Fourier transform (IFFT) matrix applied to a vector, such that null portions 1015 and non-zero portions 1017 of the IFFT matrix and corresponding null portions 1020 and non-zero portions 1025 (having M non-zero tones) of the vector produce the desired time domain samples. This corresponds to zero portions 1030 and non-zero portions 1035 of an FFT matrix applied to the desired time domain samples that are zeros 1005 and time domain feedback information 1010 to provide a frequency domain vector with zero (or close to zero) portions 1020 and non-zero portions 1025. A sub-matrix 1040 of the non-zero portions 1035 of the FFT matrix corresponding to FFT of M×N/2 may be identified that may be applied to the N/2×1 time domain samples to identify null portions 1020, and that may additionally or alternatively be used to identify the M×1 frequency domain vectors for the non-zero portions 1025.

In some examples, transmissions with such sequences may have an empty CP. In the event that N/2 is greater than M, and M is greater than or equal to the number of guard tones, a wideband transmission may be needed. In some examples, a different set of time domain samples or equivalent frequency domain vectors for the non-zero portions may be used to indicate payload or provide SRS or SR information. In other examples, the UE may be configured not to transmit SRS or SR in cases where feedback information is provided using sequences such as determined in the example of FIG. 10.

Figure 11:
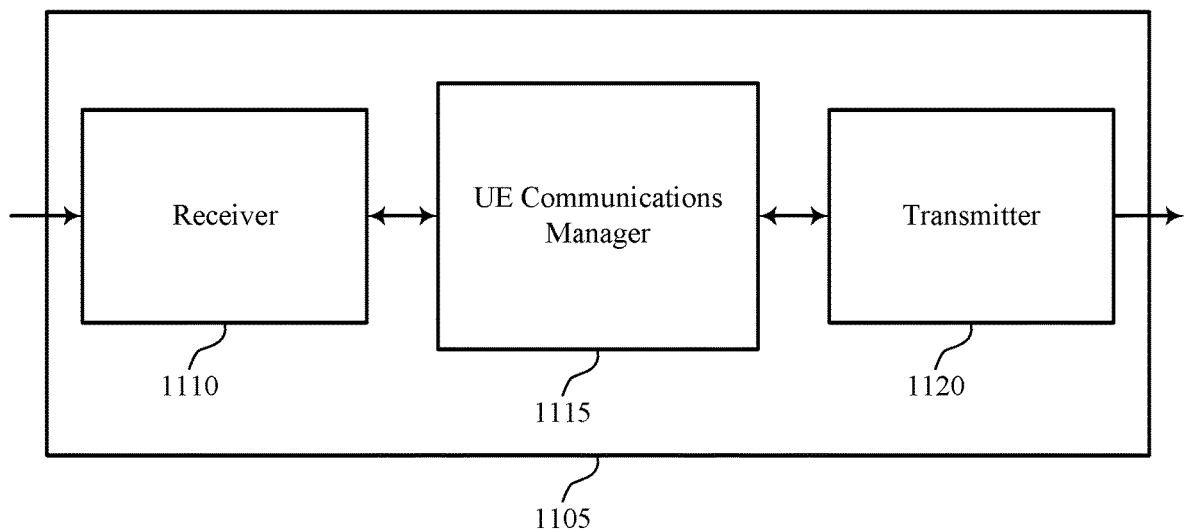
FIGS. 11 through 13 show block diagrams of a device that supports uplink common burst symbol configuration in accordance with one or more aspects of the present disclosure.

FIG. 11 shows a block diagram 1100 of a device 1105 that supports uplink common burst symbol configuration in accordance with one or more aspects of the present disclosure. Device 1105 may be an example of aspects of a UE 115 as described with reference to FIG. 1. Device 1105 may include receiver 1110, UE communications manager 1115, and transmitter 1120. Device 1105 may also include a processor. Each of these components may be in communication with one another (e.g., via one or more buses).

Receiver 1110 may receive information such as packets, user data, or control information associated with various information channels (e.g., control channels, data channels, and information related to uplink common burst symbol configuration, etc.). Information may be passed on to other components of the device. The receiver 1110 may be an example of aspects of the transceiver 1435 described with reference to FIG. 14.

UE communications manager 1115 may be an example of aspects of the UE communications manager 1415 described with reference to FIG. 14. UE communications manager 1115 may identify an uplink common burst symbol in a wireless communication subframe, determine information to be transmitted in the uplink common burst symbol, and select a transmission waveform for the uplink common burst symbol based on the information to be transmitted in the uplink common burst symbol. The UE communications manager 1115 may additionally or alternatively identify an uplink common burst symbol in a wireless communication subframe for transmission of feedback associated with a downlink transmission in the wireless communication subframe, the uplink common burst symbol having a symbol duration with a beginning portion and an end portion, identify a sub-matrix of FFT samples corresponding to the end portion of the symbol duration, identify a set of vectors associated with the sub-matrix of FFT samples, and format the feedback associated with the downlink transmission into the set of vectors.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may include a single antenna, or it may include a set of antennas.

Figure 12:
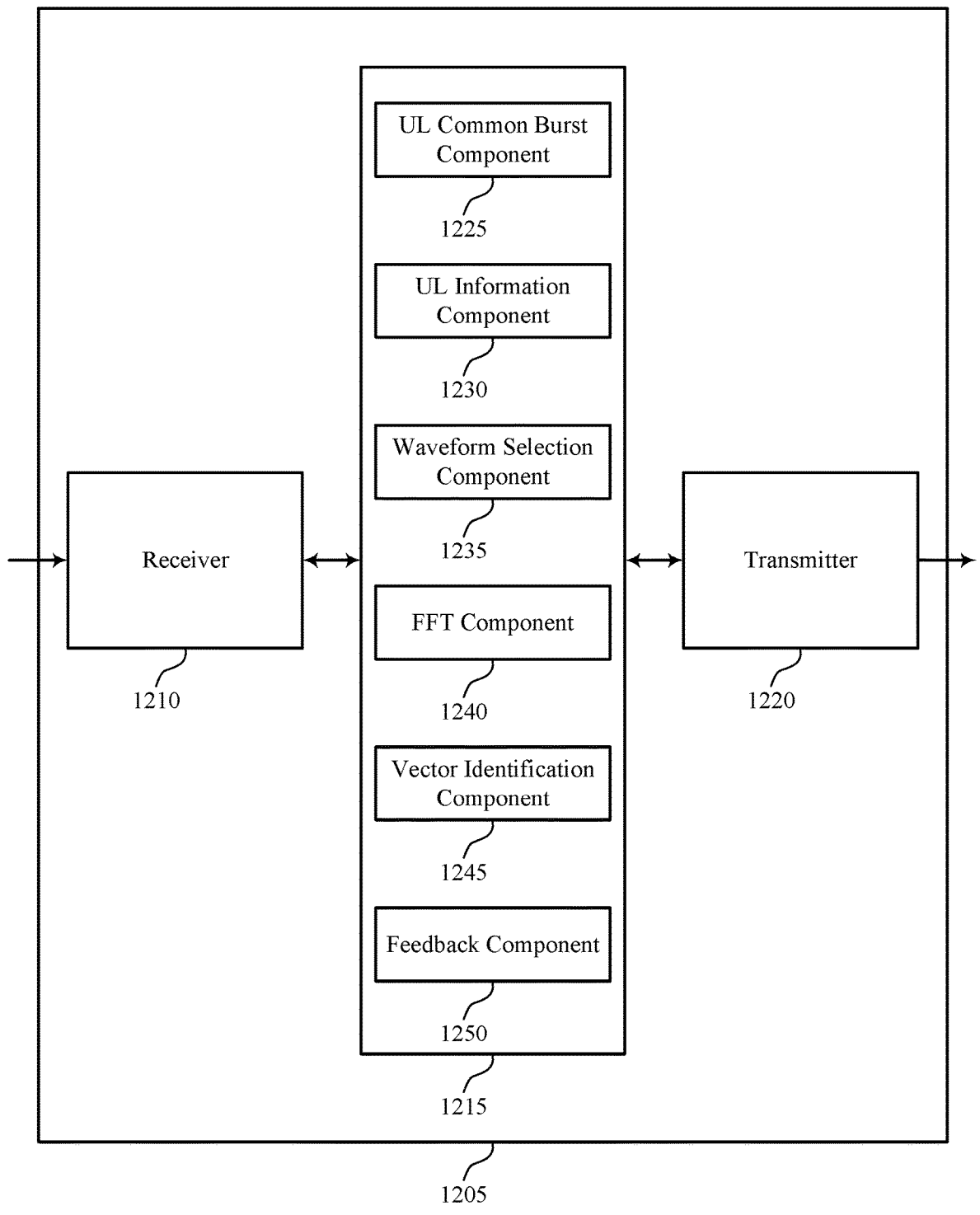

FIG. 12 shows a block diagram 1200 of a device 1205 that supports uplink common burst symbol configuration in accordance with one or more aspects of the present disclosure. Device 1205 may be an example of aspects of a device 1105 or a UE 115 as described with reference to FIGS. 1 and 11. Device 1205 may include receiver 1210, UE communications manager 1215, and transmitter 1220. Device 1205 may also include a processor. Each of these components may be in communication with one another (e.g., via one or more buses).

Receiver 1210 may receive information such as packets, user data, or control information associated with various information channels (e.g., control channels, data channels, and information related to uplink common burst symbol configuration, etc.). Information may be passed on to other components of the device. The receiver 1210 may be an example of aspects of the transceiver 1435 described with reference to FIG. 14.

UE communications manager 1215 may be an example of aspects of the UE communications manager 1415 described with reference to FIG. 14. UE communications manager 1215 may also include UL common burst component 1225, UL information component 1230, waveform selection component 1235, FFT component 1240, vector identification component 1245, and feedback component 1250.

UL common burst component 1225 may identify an uplink common burst symbol in a wireless communication subframe. The uplink common burst symbol may be used for transmission of feedback associated with a downlink transmission in the wireless communication subframe, transmission of SRS, SR, uplink data, of any combination thereof. The uplink common burst symbol may have a symbol duration with a beginning portion and an end portion.

UL information component 1230 may determine information to be transmitted in the uplink common burst symbol. In some cases, the UL information component 1230 may determine that the information to be transmitted in the uplink common burst symbol includes one or more of SRS information, SR information, or feedback information associated with a downlink transmission. In some cases, the SR information includes an indication of whether a SR is present, and the feedback information includes an acknowledgment indication, a negative acknowledgment indication, or an indication that the feedback information is not present (e.g., DTX). In some examples, a set of wideband SC-FDM sequences includes different wideband SC-FDM sequences each associated with a different combination of SRS, SR, and the feedback information. In some cases, a set of narrowband SC-FDM sequences may include different narrowband SC-FDM sequences each associated with a different combination of SR, and the feedback information.

Waveform selection component 1235 may select a transmission waveform for the uplink common burst symbol based on the information to be transmitted in the uplink common burst symbol and select an SC-FDM or OFDM waveform based on the information to be transmitted. In some cases, selecting the transmission waveform includes selecting the SC-FDM waveform when the information to be transmitted in the uplink common burst symbol includes SRS information, SR information, feedback information associated with downlink transmission, or combinations thereof. In some cases, selecting the transmission waveform additionally or alternatively includes selecting the SC-FDM waveform for a first subset of a set of frequency resources of the uplink common burst symbol and selecting the OFDM waveform for a second subset of the set of frequency resources of the uplink common burst symbol when the information to be transmitted includes both uplink data and one or more of SRS information, SR information, or feedback information. In some cases, the set of frequency resources includes a set of frequency tones associated with a set of subcarriers used to transmit the uplink common burst symbol, and the first subset of the set of frequency resources and the second subset of the set of frequency resources include alternating tones of the set of frequency tones. In some cases, selecting the transmission waveform additionally or alternatively includes selecting a SC-FDM waveform sequence from a set of available SC-FDM sequences based on the information to be transmitted in the uplink common burst symbol. In some cases, selecting the transmission waveform additionally or alternatively includes selecting a SC-FDM low peak to average ratio (PAPR) sequence from a set of available SC-FDM sequences based on the information to be transmitted in the uplink common burst symbol.

FFT component 1240 may identify a sub-matrix of FFT samples corresponding to the end portion of the symbol duration. Vector identification component 1245 may identify a set of vectors associated with the sub-matrix of FFT samples and identify a different set of vectors associated with the sub-matrix of FFT samples.

Feedback component 1250 may format the feedback associated with the downlink transmission into the set of vectors, determine, during the beginning portion, the feedback associated with the downlink transmission, and format the feedback includes dropping a cyclic prefix associated with the feedback.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may include a single antenna, or it may include a set of antennas.

Figure 13:
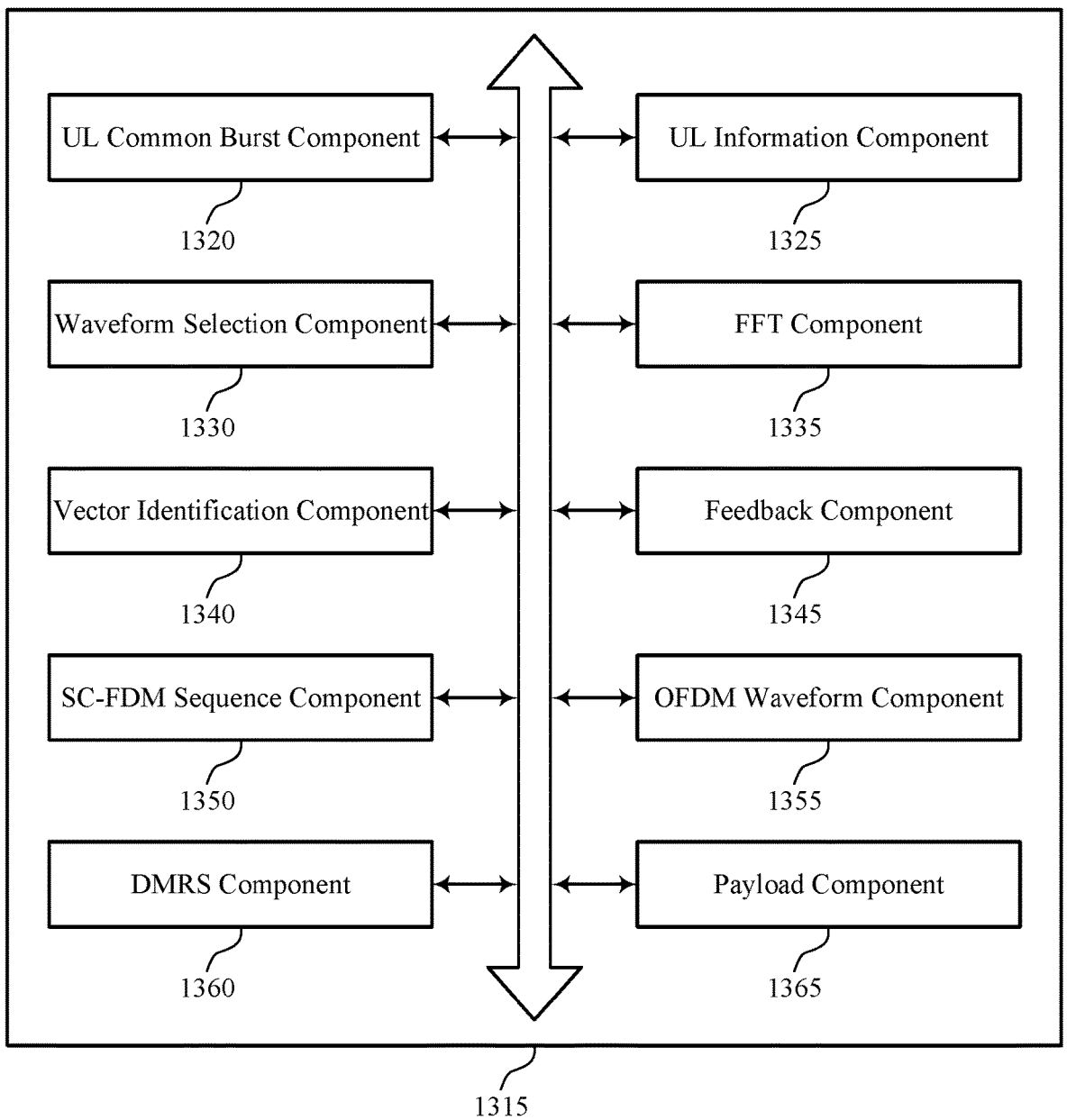

FIG. 13 shows a block diagram 1300 of a UE communications manager 1315 that supports uplink common burst symbol configuration in accordance with one or more aspects of the present disclosure. The UE communications manager 1315 may be an example of aspects of a UE communications manager 1115, a UE communications manager 1215, or a UE communications manager 1415 described with reference to FIGS. 11, 12, and 14. The UE communications manager 1315 may include UL common burst component 1320, UL information component 1325, waveform selection component 1330, FFT component 1335, vector identification component 1340, feedback component 1345, SC-FDM sequence component 1350, OFDM waveform component 1355, DMRS component 1360, and payload component 1365. Each of these modules may communicate, directly or indirectly, with one another (e.g., via one or more buses).

UL common burst component 1320 may identify an uplink common burst symbol in a wireless communication subframe and identify an uplink common burst symbol in a wireless communication subframe for transmission of feedback associated with a downlink transmission in the wireless communication subframe, the uplink common burst symbol having a symbol duration with a beginning portion and an end portion.

UL information component 1325 may determine information to be transmitted in the uplink common burst symbol. In some cases, a set of wideband SC-FDM sequences includes different wideband SC-FDM sequences each associated with a different combination of SRS, SR, and the feedback information, that indicate whether a SR is present, and the feedback information. In some cases, the set of wideband SC-FDM sequences includes different wideband SC-FDM sequences each associated with a different combination of SRS, SR, and the feedback information, and a set of narrowband SC-FDM sequences includes different narrowband SC-FDM sequences each associated with a different combination of SR, and the feedback information.

Waveform selection component 1330 may select a transmission waveform for the uplink common burst symbol based on the information to be transmitted in the uplink common burst symbol. In some cases, selecting the transmission waveform additionally or alternatively includes selecting the SC-FDM waveform when the information to be transmitted in the uplink common burst symbol includes SRS information, SR information, feedback information associated with a downlink transmission, or combinations thereof. In some cases, selecting the transmission waveform additionally or alternatively includes selecting the SC-FDM waveform for a first subset of a set of frequency resources of the uplink common burst symbol and selecting the OFDM waveform for a second subset of the set of frequency resources of the uplink common burst symbol when the information to be transmitted includes both uplink data and one or more of SRS information, SR information, or feedback information. In some cases, the set of frequency resources includes a set of frequency tones associated with a set of subcarriers used to transmit the uplink common burst symbol, and where the first subset of the set of frequency resources and the second subset of the set of frequency resources include alternating tones of the set of frequency tones.

FFT component 1335 may identify a sub-matrix of FFT samples corresponding to the end portion of the symbol duration. Vector identification component 1340 may identify a set of vectors associated with the sub-matrix of FFT samples and identify a different set of vectors associated with the sub-matrix of FFT samples.

Feedback component 1345 may format the feedback associated with the downlink transmission into the set of vectors, determine, during the beginning portion, the feedback associated with the downlink transmission, and format the feedback includes dropping a cyclic prefix associated with the feedback.

SC-FDM sequence component 1350 may identify a set of wideband SC-FDM sequences, select the SC-FDM sequence from the set of wideband SC-FDM sequences based on which of the SRS information, SR information, feedback information, or combinations thereof, are to be transmitted in the uplink common burst symbol. SC-FDM sequence component 1350 may, in some cases, identify a set of wideband SC-FDM sequences and a set of narrowband SC-FDM sequences, select the SC-FDM sequence from the set of wideband SC-FDM sequences when SRS information is to be transmitted in the uplink common burst symbol, and select the SC-FDM sequence from the set of narrowband SC-FDM sequences when no SRS information is to be transmitted in the uplink common burst symbol. In some cases, the set of narrowband SC-FDM sequences include a same sequence transmitted on different narrowband resources, each of the different narrowband resources associated with a different combination of SR, and the feedback information. In some cases, cyclic shifts are selected to provide a subset of frequency tones having a same value irrespective of the cyclic shifts from a base sequence. In some cases, the set of available SC-FDM sequences each have a sequence length of N and the information to be transmitted in the uplink common burst symbol includes feedback information having M possible states, and where the SC-FDM sequences are selected to provide equally spaced sequences for M cyclic shifts associated with the M possible states of the feedback information. In some cases, the N is not a multiple of M. In some cases, the N is a multiple of M. In some cases, each of the cyclic shifts are associated with a combination of SRS, SR and feedback information. In some cases, the set of available SC-FDM sequences are selected to provide detection based on cyclic shifts from a base sequence.

OFDM waveform component 1355 may select the OFDM waveform for at least a portion of the uplink common burst symbol for transmission of uplink data, and transmit one or more of a SR or feedback information in the uplink data. In some cases, the OFDM waveform is used for a portion of uplink resources, and the SC-FDM waveform is used for other portions of the uplink resources.

DMRS component 1360 may transmit a DMRS in the transmission waveform. In some cases, the uplink data includes feedback information that is modulated on the DMRS.

Payload component 1365 may format a payload associated with the uplink common burst symbol into the different set of vectors. In some cases, the payload includes one or more of the feedback associated with the downlink transmission, a SR or a feedback.

Figure 14:
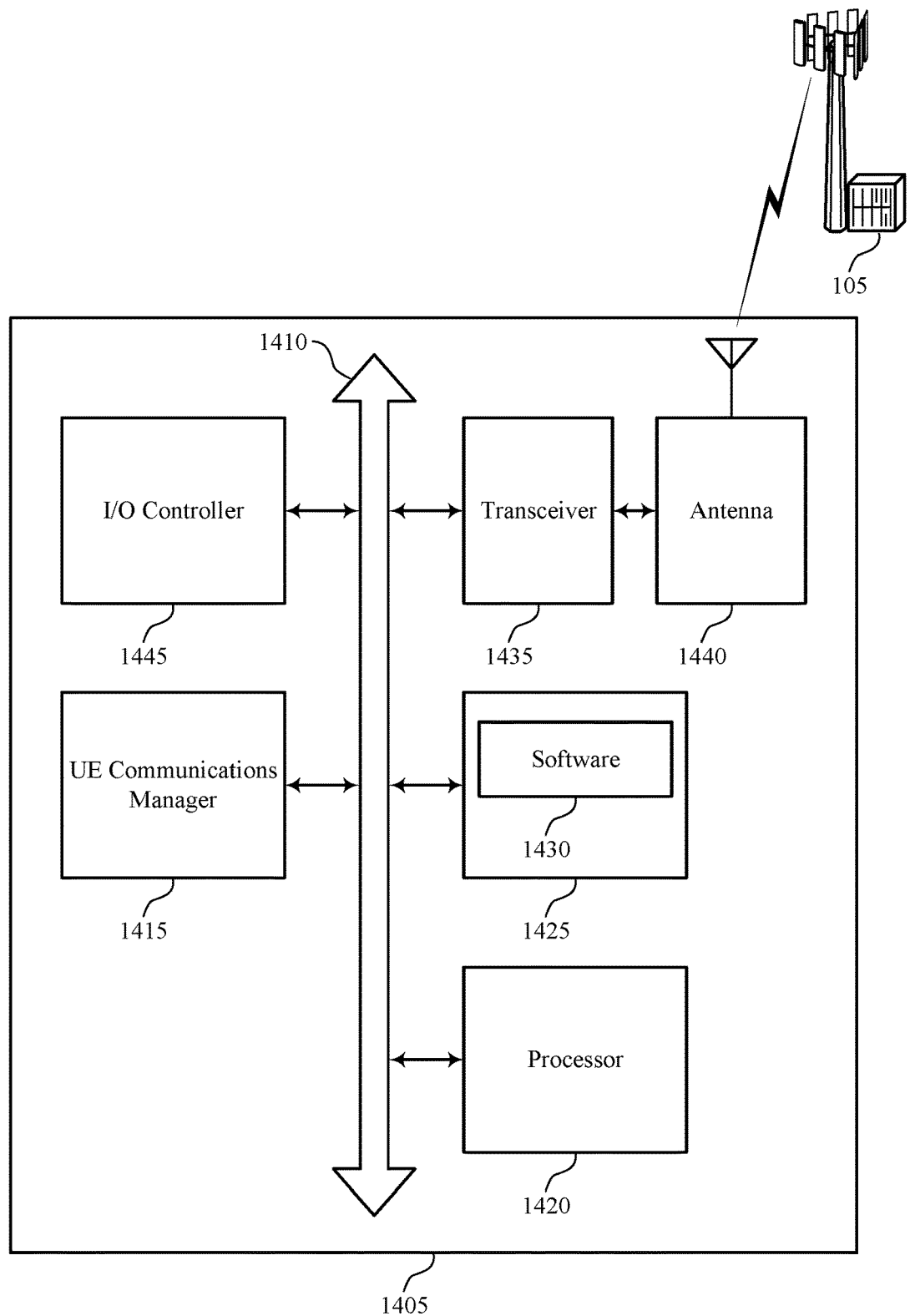
FIG. 14 illustrates a block diagram of a system including a UE that supports uplink common burst symbol configuration in accordance with one or more aspects of the present disclosure.

FIG. 14 shows a diagram of a system 1400 including a device 1405 that supports uplink common burst symbol configuration in accordance with one or more aspects of the present disclosure. Device 1405 may be an example of or include the components of device 1105, device 1205, or a UE 115 as described above, e.g., with reference to FIGS. 1, 11 and 12. Device 1405 may include components for bi-directional voice and data communications including components for transmitting and receiving communications, including UE communications manager 1415, processor 1420, memory 1425, software 1430, transceiver 1435, antenna 1440, and I/O controller 1445. These components may be in electronic communication via one or more busses (e.g., bus 1410). Device 1405 may communicate wirelessly with one or more base stations 105.

Processor 1420 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting uplink common burst symbol configuration).

Memory 1425 may include random access memory (RAM) and read only memory (ROM). The memory 1425 may store computer-readable, computer-executable software 1430 including instructions that, when executed, cause the processor to perform various functions described herein. In some cases, the memory 1425 may contain, among other things, a basic input/output system (BIOS) which may control basic hardware and/or software operation such as the interaction with peripheral components or devices.

Software 1430 may include code to implement aspects of the present disclosure, including code to support uplink common burst symbol configuration. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system.

Figure 15:
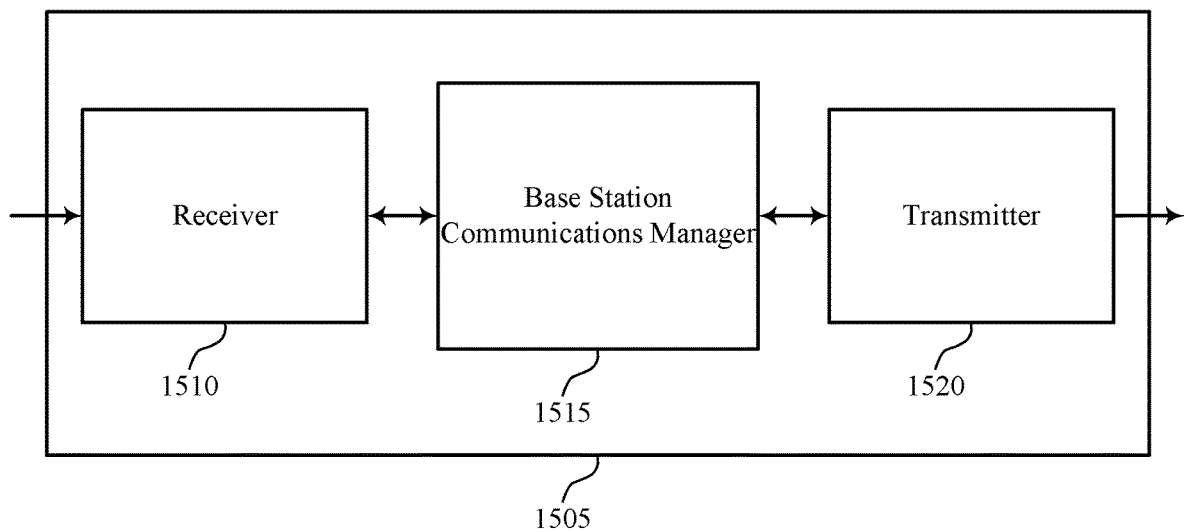
FIGS. 15 through 17 show block diagrams of a device that supports uplink common burst symbol configuration in accordance with one or more aspects of the present disclosure.

FIG. 15 shows a block diagram 1500 of a device 1505 that supports uplink common burst symbol configuration in accordance with one or more aspects of the present disclosure. Device 1505 may be an example of aspects of a base station 105 as described with reference to FIG. 1. Device 1505 may include receiver 1510, base station communications manager 1515, and transmitter 1520. Device 1505 may also include a processor. Each of these components may be in communication with one another (e.g., via one or more buses).

Receiver 1510 may receive information such as packets, user data, or control information associated with various information channels (e.g., control channels, data channels, and information related to uplink common burst symbol configuration, etc.). Information may be passed on to other components of the device. The receiver 1510 may be an example of aspects of the transceiver 1835 described with reference to FIG. 18.

Base station communications manager 1515 may be an example of aspects of the base station communications manager 1815 described with reference to FIG. 18. Base station communications manager 1515 may allocate uplink common burst symbol resources to a UE for transmission of an uplink common burst symbol, identify a set of transmission waveforms available for the uplink common burst symbol, each transmission waveform of the set of transmission waveforms associated with different information to be transmitted in the uplink common burst symbol, receive the uplink common burst symbol from the UE, determine the transmission waveform of the uplink common burst symbol, and determine the information included in the uplink common burst symbol based on the determined transmission waveform of the uplink common burst symbol.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1835 described with reference to FIG. 18. The transmitter 520 may include a single antenna, or it may include a set of antennas.

Figure 16:
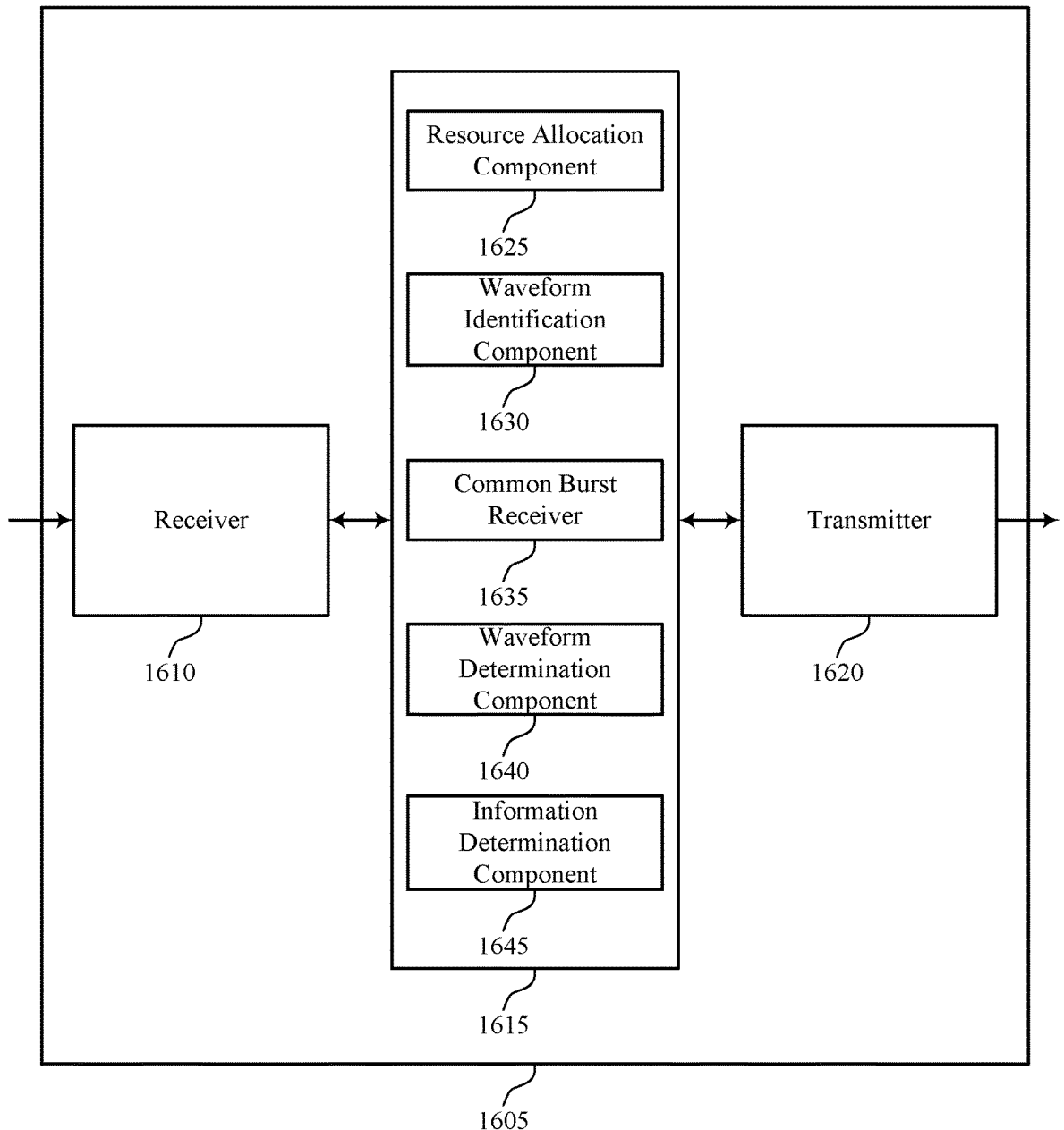

FIG. 16 shows a block diagram 1600 of a device 1605 that supports uplink common burst symbol configuration in accordance with one or more aspects of the present disclosure. Device 1605 may be an example of aspects of a device 1505 or a base station 105 as described with reference to FIGS. 1 and 15. Device 1605 may include receiver 1610, base station communications manager 1615, and transmitter 1620. Device 1605 may also include a processor. Each of these components may be in communication with one another (e.g., via one or more buses).

Receiver 1610 may receive information such as packets, user data, or control information associated with various information channels (e.g., control channels, data channels, and information related to uplink common burst symbol configuration, etc.). Information may be passed on to other components of the device. The receiver 1610 may be an example of aspects of the transceiver 1835 described with reference to FIG. 18.

Base station communications manager 1615 may be an example of aspects of the base station communications manager 1815 described with reference to FIG. 18.

Base station communications manager 1615 may also include resource allocation component 1625, waveform identification component 1630, common burst receiver 1635, waveform determination component 1640, and information determination component 1645.

Resource allocation component 1625 may allocate uplink common burst symbol resources to a UE for transmission of an uplink common burst symbol.

Waveform identification component 1630 may identify a set of transmission waveforms available for the uplink common burst symbol, each transmission waveform of the set of transmission waveforms associated with different information to be transmitted in the uplink common burst symbol. In some cases, waveform identification component 1630 may and configure the UE to select the SC-FDM waveform for a first subset of a set of frequency resources of the uplink common burst symbol and the OFDM waveform for a second subset of the set of frequency resources of the uplink common burst symbol when the information to be transmitted includes both uplink data and one or more of SRS information, SR information, or feedback information. In some cases, the set of frequency resources includes a set of frequency tones associated with a set of subcarriers used to transmit the uplink common burst symbol, and where the first subset of the set of frequency resources and the second subset of the set of frequency resources include alternating tones of the set of frequency tones. In some cases, determining the information included is based on a mapping between the set of transmission waveforms and the different information to be transmitted in the uplink common burst symbol.

Common burst receiver 1635 may receive the uplink common burst symbol from the UE. Waveform determination component 1640 may determine the transmission waveform of the uplink common burst symbol, and in some cases coherently combine, based on channel estimation, two or more frequency domain samples of the set of frequency tones, and coherently combine, based on the channel estimation, an energy of time domain samples after the IDFT.

Information determination component 1645 may determine the information included in the uplink common burst symbol based on the determined transmission waveform of the uplink common burst symbol and determine that the information includes the uplink data based on determining that the transmission waveform is an OFDM waveform. In some cases, the information transmitted in the uplink common burst symbol additionally or alternatively includes SRS information, and where determining the information included in the uplink common burst symbol additionally or alternatively includes determining that the information includes SRS information based on determining that the transmission waveform is a SC-FDM waveform for a first portion of the uplink common burst symbol.

Transmitter 1620 may transmit signals generated by other components of the device. In some examples, the transmitter 1620 may be collocated with a receiver 1610 in a transceiver module. For example, the transmitter 1620 may be an example of aspects of the transceiver 1835 described with reference to FIG. 18. The transmitter 1620 may include a single antenna, or it may include a set of antennas.

Figure 17:
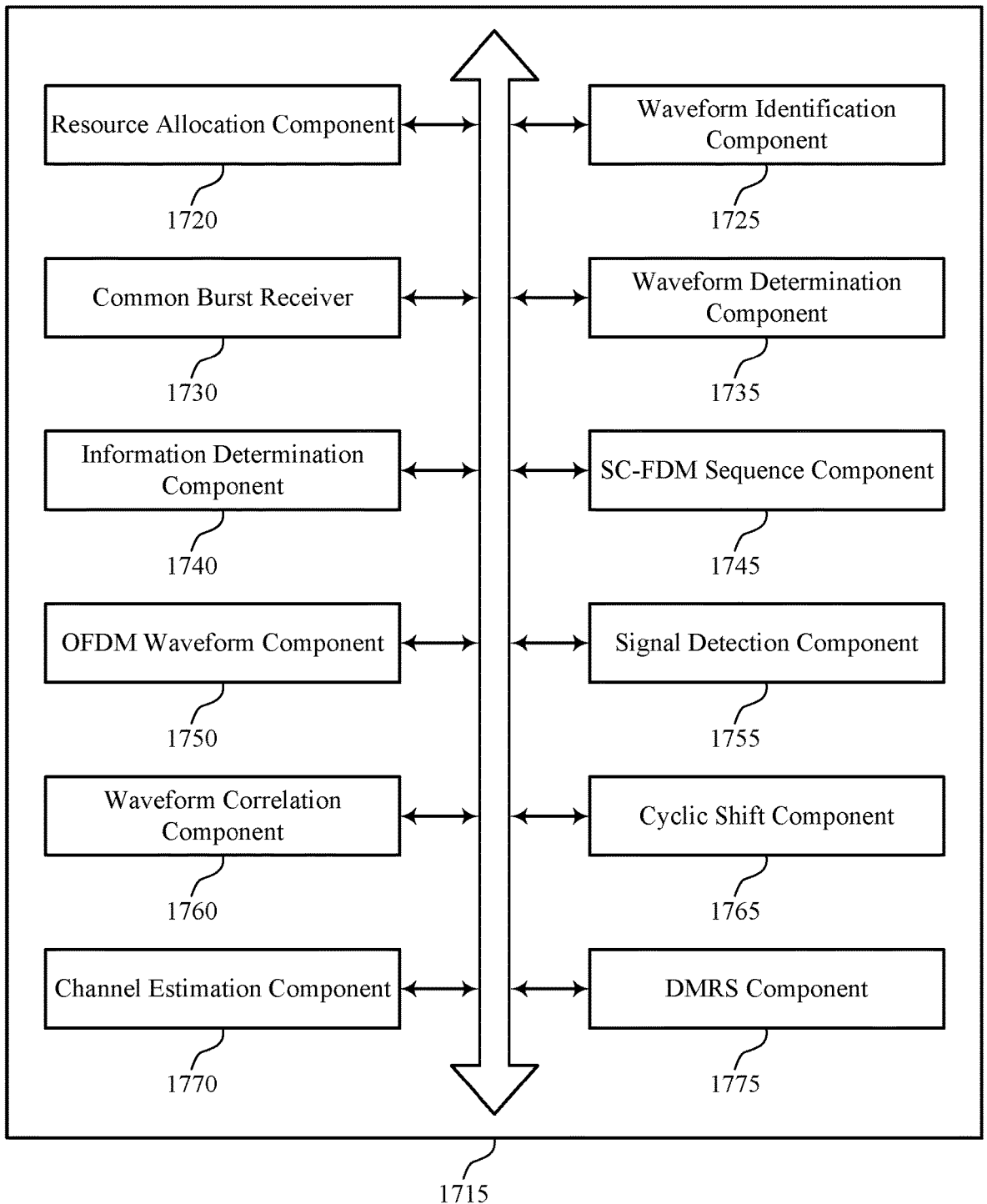

FIG. 17 shows a block diagram 1700 of a base station communications manager 1715 that supports uplink common burst symbol configuration in accordance with one or more aspects of the present disclosure. The base station communications manager 1715 may be an example of aspects of a base station communications manager 1815 described with reference to FIGS. 15, 16, and 18. The base station communications manager 1715 may include resource allocation component 1720, waveform identification component 1725, common burst receiver 1730, waveform determination component 1735, information determination component 1740, SC-FDM sequence component 1745, OFDM waveform component 1750, signal detection component 1755, waveform correlation component 1760, cyclic shift component 1765, channel estimation component 1770, and DMRS component 1775. Each of these modules may communicate, directly or indirectly, with one another (e.g., via one or more buses).

Resource allocation component 1720 may allocate uplink common burst symbol resources to a UE for transmission of an uplink common burst symbol.

Waveform identification component 1725 may identify a set of transmission waveforms available for the uplink common burst symbol, each transmission waveform of the set of transmission waveforms associated with different information to be transmitted in the uplink common burst symbol. In some cases, waveform identification component 1725 may and configure the UE to select the SC-FDM waveform for a first subset of a set of frequency resources of the uplink common burst symbol and the OFDM waveform for a second subset of the set of frequency resources of the uplink common burst symbol when the information to be transmitted includes both uplink data and one or more of SRS information, SR information, or feedback information. In some cases, the set of frequency resources includes a set of frequency tones associated with a set of subcarriers used to transmit the uplink common burst symbol, and where the first subset of the set of frequency resources and the second subset of the set of frequency resources include alternating tones of the set of frequency tones. In some cases, determining the information included is based on a mapping between the set of transmission waveforms and the different information to be transmitted in the uplink common burst symbol Common burst receiver 1730 may receive the uplink common burst symbol from the UE. Waveform determination component 1735 may determine the transmission waveform of the uplink common burst symbol, coherently combine, based on the channel estimation, two or more frequency domain samples of the set of frequency tones, and coherently combine, based on the channel estimation, an energy of time domain samples after the IDFT.

Information determination component 1740 may determine the information included in the uplink common burst symbol based on the determined transmission waveform of the uplink common burst symbol and determine that the information includes the uplink data based on determining that the transmission waveform is an OFDM waveform for a second portion of the uplink common burst symbol. In some cases, the information transmitted in the uplink common burst symbol additionally or alternatively includes SRS information, and where determining the information included in the uplink common burst symbol additionally or alternatively includes determining that the information includes SRS information based on determining that the transmission waveform is a SC-FDM waveform for a first portion of the uplink common burst symbol.

SC-FDM sequence component 1745 may configure the UE to select the SC-FDM waveform when the information to be transmitted in the uplink common burst symbol includes SRS information, SR information, feedback information associated with a downlink transmission, or combinations thereof. In some cases, the set of transmission waveforms includes a subset of SC-FDM waveforms having different sequences, and where the transmission waveform of the uplink common burst symbol is selected from the subset of SC-FDM waveforms based on the information to be transmitted in the uplink common burst symbol. In some cases, the subset of SC-FDM waveforms includes a set of wideband SC-FDM sequences that are selected based on which of the SRS information, SR information, feedback information, or combinations thereof, are transmitted in the uplink common burst symbol. In some cases, the SR information includes an indication of whether a SR is present, and the feedback information includes an acknowledgment indication, a negative acknowledgment indication, or an indication that the feedback information is not present. In some cases, the subset of SC-FDM waveforms includes a first set of wideband SC-FDM sequences and a second set of narrowband SC-FDM sequences, and where the transmission waveform of the uplink common burst symbol is selected from the first set of wideband SC-FDM sequences when SRS information is transmitted in the uplink common burst symbol, and the transmission waveform of the uplink common burst symbol is selected from the second set narrowband SC-FDM sequences when no SRS information is transmitted in the uplink common burst symbol.

OFDM waveform component 1750 may configure the UE to select the OFDM waveform when the information to be transmitted in the uplink common burst symbol includes uplink data and identify a SR or feedback information in the uplink data. In some cases, the information to be transmitted in the uplink common burst symbol includes uplink data, and where the transmission waveform is selected to be the OFDM waveform for at least a portion of the uplink common burst symbol.

Signal detection component 1755 may determine a signal associated with each of a set of frequency tones of the received the uplink common burst symbol. In some cases, the signal may be a signal from a tap of an IDFT component.

Waveform correlation component 1760 may correlate the signal associated with each of the set of frequency tones with the set of transmission waveforms and identify the transmission waveform of the uplink common burst symbol based on the correlating. In some cases, the correlating includes applying an inverse discrete Fourier transform (IDFT) to the set of frequency tones of the received the uplink common burst symbol to generate a time domain sequence. In some cases, the correlating additionally or alternatively includes selecting the transmission waveform associated with a cyclic shift of the set of cyclic shifts having a highest correlation value.

Cyclic shift component 1765 may perform a set of cyclic shifts on the time domain sequence, each of the set of cyclic shifts corresponding to a different transmission waveform of the set of transmission waveforms. In some cases, the set of cyclic shifts are selected to provide a subset of frequency tones having a same value irrespective of a cyclic shifts from a base sequence. In some cases, the information to be transmitted in the uplink common burst symbol includes feedback information having M possible states, and where the SC-FDM sequences are selected to provide M equally spaced sequences for M cyclic shifts associated with the M possible states of the feedback information, and where a length of the SC-FDM sequences may or may not be a multiple of M.

Channel estimation component 1770 may filter the set of cyclic shifts based on a channel estimation associated with a prior transmission of the UE, perform a channel estimation for the UE based on the set of frequency tones of the received uplink common burst symbol, or based on a subset of frequency tones of the received uplink common burst symbol. In some cases, the channel estimation component 1770 may add two or more time domain samples associated with the subset of frequency tones with a channel estimation for the UE is based on the added time domain samples. In some cases, the channel estimation component 1770 may weight one or more time domain samples associated with the set of cyclic shifts, and the channel estimation for the UE is based on the weighted time domain samples. In some cases, the channel estimation for the UE is based on the transmission waveform of the uplink common burst symbol.

DMRS component 1775 may receive a DMRS in the transmission waveform and may receive feedback information that is modulated on the DMRS.

Figure 18:
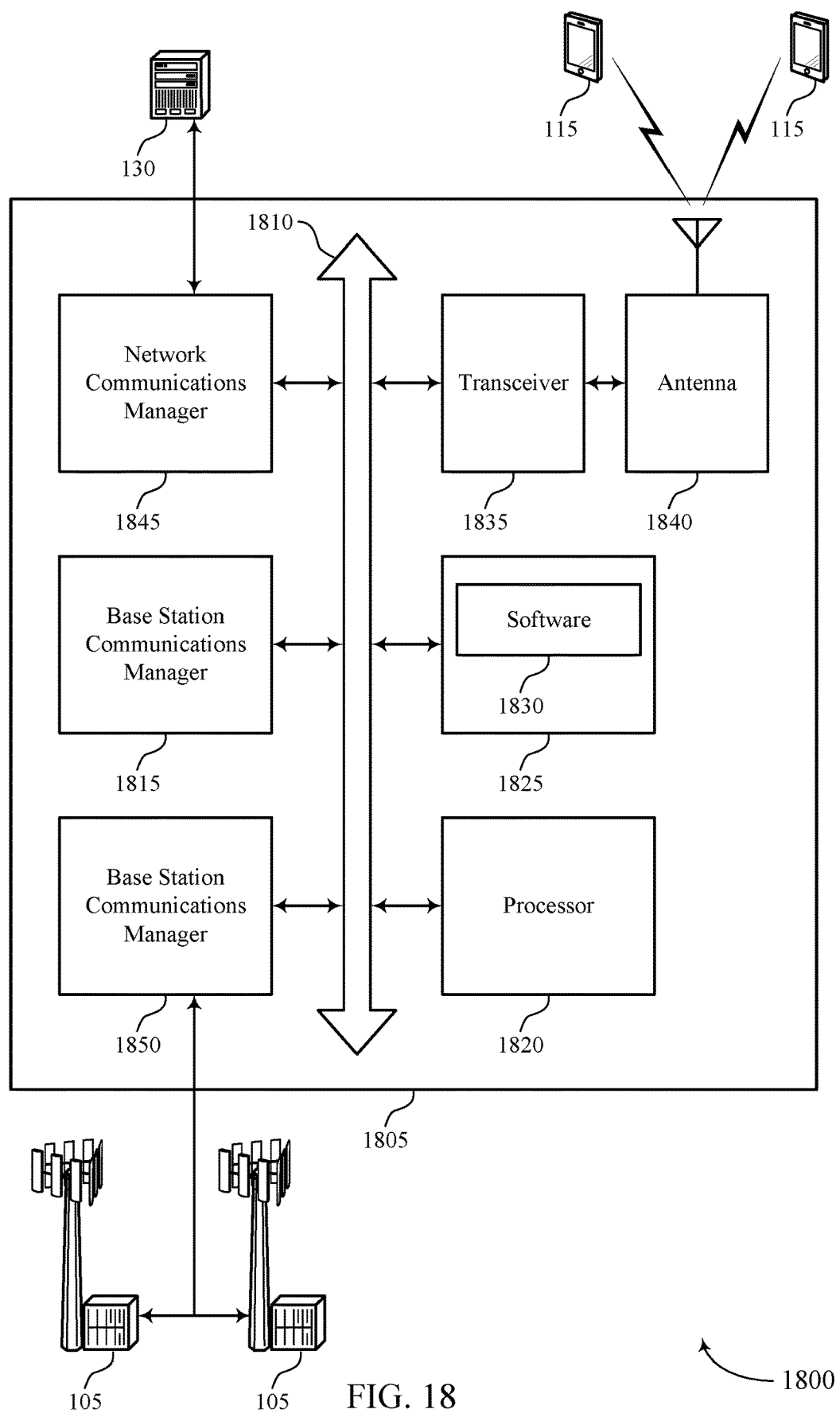
FIG. 18 illustrates a block diagram of a system including a base station that supports uplink common burst symbol configuration in accordance with one or more aspects of the present disclosure.

FIG. 18 shows a diagram of a system 1800 including a device 1805 that supports uplink common burst symbol configuration in accordance with one or more aspects of the present disclosure. Device 1805 may be an example of or include the components of base station 105 as described above, e.g., with reference to FIG. 1. Device 1805 may include components for bi-directional voice and data communications including components for transmitting and receiving communications, including base station communications manager 1815, processor 1820, memory 1825, software 1830, transceiver 1835, antenna 1840, network communications manager 1845, and base station communications manager 1850. These components may be in electronic communication via one or more busses (e.g., bus 1810). Device 1805 may communicate wirelessly with one or more UEs 115.

Base station communications manager 1815 may manage communications with other base station 105, and may include a controller or scheduler for controlling communications with UEs 115 in cooperation with other base stations 105. For example, the base station communications manager 1815 may coordinate scheduling for transmissions to UEs 115 for various interference mitigation techniques such as beamforming or joint transmission. In some examples, base station communications manager 1815 may provide an X2 interface within an LTE/LTE-A wireless communication network technology to provide communication between base stations 105.

Processor 1820 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1820 may be configured to operate a memory array using a memory controller. In other cases, a memory controller may be integrated into processor 1820. Processor 1820 may be configured to execute computer-readable instructions stored in a memory to perform various functions (e.g., functions or tasks supporting uplink common burst symbol configuration).

Memory 1825 may include RAM and ROM. The memory 1825 may store computer-readable, computer-executable software 1830 including instructions that, when executed, cause the processor to perform various functions described herein. In some cases, the memory 1825 may contain, among other things, a BIOS which may control basic hardware and/or software operation such as the interaction with peripheral components or devices.

Software 1830 may include code to implement aspects of the present disclosure, including code to support uplink common burst symbol configuration. Software 1830 may be stored in a non-transitory computer-readable medium such as system memory or other memory. In some cases, the software 1830 may not be directly executable by the processor but may cause a computer (e.g., when compiled and executed) to perform functions described herein.

Transceiver 1835 may communicate bi-directionally, via one or more antennas, wired, or wireless links as described above. For example, the transceiver 1835 may represent a wireless transceiver and may communicate bi-directionally with another wireless transceiver. The transceiver 1835 may also include a modem to modulate the packets and provide the modulated packets to the antennas for transmission, and to demodulate packets received from the antennas.

In some cases, the wireless device may include a single antenna 1840. However, in some cases the device may have more than one antenna 1840, which may be capable of concurrently transmitting or receiving multiple wireless transmissions.

Network communications manager 1845 may manage communications with the core network (e.g., via one or more wired backhaul links). For example, the network communications manager 1845 may manage the transfer of data communications for client devices, such as one or more UEs 115.

Base station communications manager 1850 may manage communications with other base station 105, and may include a controller or scheduler for controlling communications with UEs 115 in cooperation with other base stations 105. For example, the base station communications manager 1850 may coordinate scheduling for transmissions to UEs 115 for various interference mitigation techniques such as beamforming or joint transmission. In some examples, base station communications manager 1850 may provide an X2 interface within an LTE/LTE-A wireless communication network technology to provide communication between base stations 105.

Figure 19:
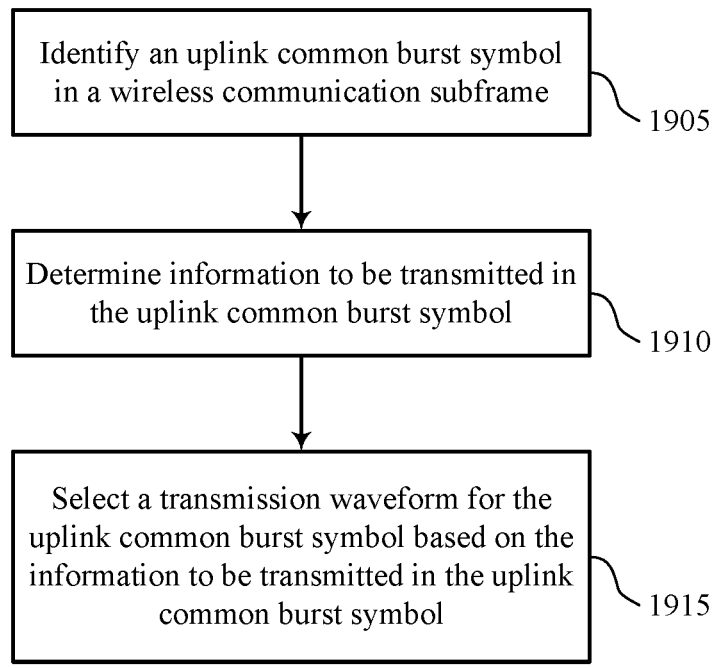
FIGS. 19 through 25 illustrate methods for uplink common burst symbol configuration in accordance with one or more aspects of the present disclosure.

FIG. 19 shows a flowchart illustrating a method 1900 for uplink common burst symbol configuration in accordance with one or more aspects of the present disclosure. The operations of method 1900 may be implemented by a UE 115 or its components as described herein. For example, the operations of method 1900 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects the functions described below using special-purpose hardware.

At 1905 the UE 115 may identify an uplink common burst symbol in a wireless communication subframe. The operations of block 1905 may be performed according to the methods described with reference to FIGS. 1 through 10. In some examples, aspects of the operations of block 1905 may be performed by a UL common burst component as described with reference to FIGS. 11 through 14.

At 1910 the UE 115 may determine information to be transmitted in the uplink common burst symbol. The operations of block 1910 may be performed according to the methods described with reference to FIGS. 1 through 10. In some examples, aspects of the operations of block 1910 may be performed by a UL information component as described with reference to FIGS. 11 through 14.

At 1915 the UE 115 may select a transmission waveform for the uplink common burst symbol based at least in part on the information to be transmitted in the uplink common burst symbol. The operations of block 1915 may be performed according to the methods described with reference to FIGS. 1 through 10. In some examples, aspects of the operations of block 1915 may be performed by a waveform selection component as described with reference to FIGS. 11 through 14.

Figure 20:
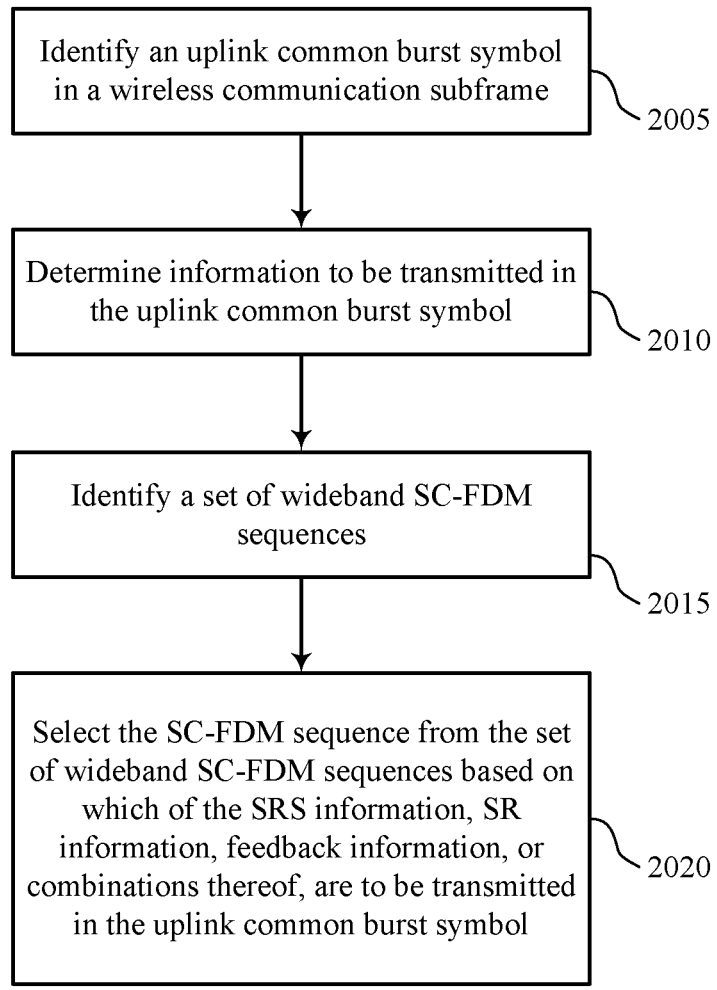

FIG. 20 shows a flowchart illustrating a method 2000 for uplink common burst symbol configuration in accordance with one or more aspects of the present disclosure. The operations of method 2000 may be implemented by a UE 115 or its components as described herein. For example, the operations of method 2000 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects the functions described below using special-purpose hardware.

At 2005 the UE 115 may identify an uplink common burst symbol in a wireless communication subframe. The operations of block 2005 may be performed according to the methods described with reference to FIGS. 1 through 10. In some examples, aspects of the operations of block 2005 may be performed by a UL common burst component as described with reference to FIGS. 11 through 14.

At 2010 the UE 115 may determine information to be transmitted in the uplink common burst symbol. The operations of block 2010 may be performed according to the methods described with reference to FIGS. 1 through 10. In some examples, aspects of the operations of block 2010 may be performed by a UL information component as described with reference to FIGS. 11 through 14.

At 2015 the UE 115 may identify a set of wideband SC-FDM sequences. The operations of block 2015 may be performed according to the methods described with reference to FIGS. 1 through 10. In some examples, aspects of the operations of block 2015 may be performed by a SC-FDM sequence component as described with reference to FIGS. 11 through 14.

At 2020 the UE 115 may select the SC-FDM sequence from the set of wideband SC-FDM sequences based at least in part on which of the SRS information, SR information, feedback information, or combinations thereof, are to be transmitted in the uplink common burst symbol. The operations of block 2020 may be performed according to the methods described with reference to FIGS. 1 through 10. In some examples, aspects of the operations of block 2020 may be performed by a SC-FDM sequence component as described with reference to FIGS. 11 through 14.

In some cases, selecting the SC-FDM sequence comprises determining that the information to be transmitted in the uplink common burst symbol comprises one or more of SRS information, SR information, or feedback information associated with a downlink transmission.

In some cases, selecting the transmission waveform additionally or alternatively comprises selecting a SC-FDM waveform sequence from a set of available SC-FDM sequences based at least in part on the information to be transmitted in the uplink common burst symbol. In some cases, selecting the transmission waveform additionally or alternatively includes selecting a SC-FDM low PAPR sequence from a set of available SC-FDM sequences based on the information to be transmitted in the uplink common burst symbol.

Figure 21:
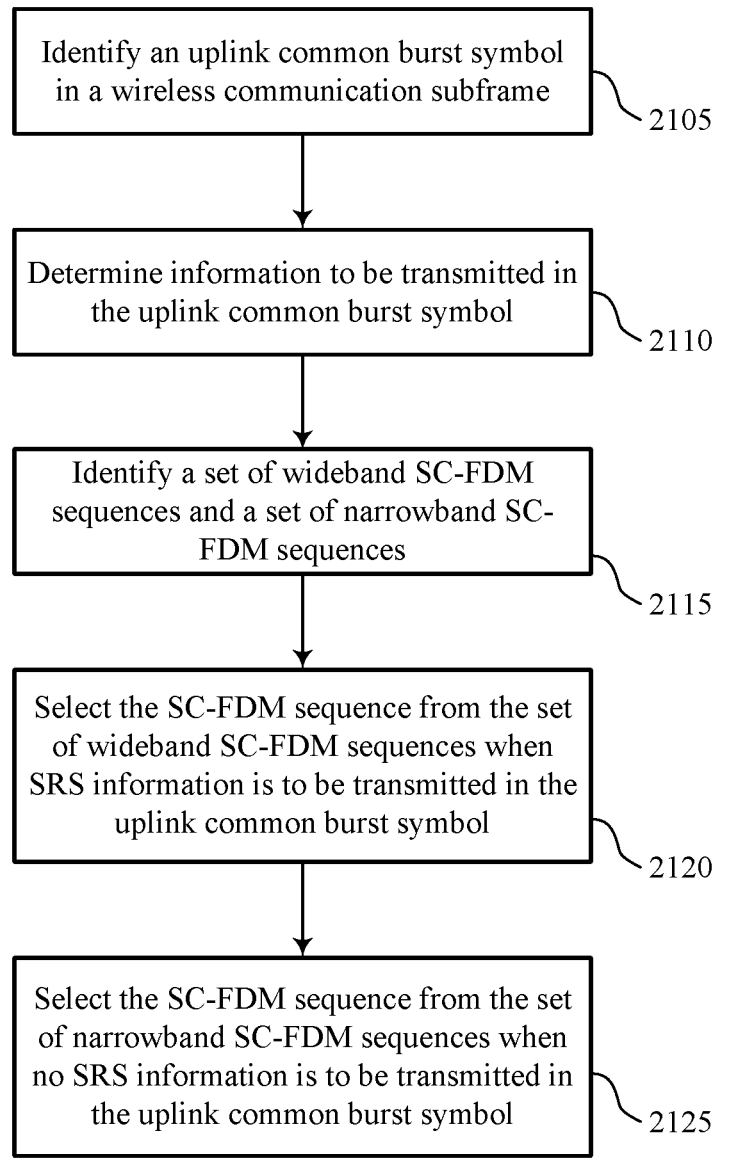

FIG. 21 shows a flowchart illustrating a method 2100 for uplink common burst symbol configuration in accordance with one or more aspects of the present disclosure. The operations of method 2100 may be implemented by a UE 115 or its components as described herein. For example, the operations of method 2100 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects the functions described below using special-purpose hardware.

At 2105 the UE 115 may identify an uplink common burst symbol in a wireless communication subframe. The operations of block 2105 may be performed according to the methods described with reference to FIGS. 1 through 10. In some examples, aspects of the operations of block 2105 may be performed by a UL common burst component as described with reference to FIGS. 11 through 14.

At 2110 the UE 115 may determine information to be transmitted in the uplink common burst symbol. The operations of block 2110 may be performed according to the methods described with reference to FIGS. 1 through 10. In some examples, aspects of the operations of block 2110 may be performed by a UL information component as described with reference to FIGS. 11 through 14.

At 2115 the UE 115 may identify a set of wideband SC-FDM sequences and a set of narrowband SC-FDM sequences. The operations of block 2115 may be performed according to the methods described with reference to FIGS. 1 through 10. In some examples, aspects of the operations of block 2115 may be performed by a SC-FDM sequence component as described with reference to FIGS. 11 through 14.

At 2120 the UE 115 may select the SC-FDM sequence from the set of wideband SC-FDM sequences when SRS information is to be transmitted in the uplink common burst symbol. The operations of block 2120 may be performed according to the methods described with reference to FIGS. 1 through 10. In some examples, aspects of the operations of block 2120 may be performed by a SC-FDM sequence component as described with reference to FIGS. 11 through 14.

At 2125 the UE 115 may select the SC-FDM sequence from the set of narrowband SC-FDM sequences when no SRS information is to be transmitted in the uplink common burst symbol. The operations of block 2125 may be performed according to the methods described with reference to FIGS. 1 through 10. In some examples, aspects of the operations of block 2125 may be performed by a SC-FDM sequence component as described with reference to FIGS. 11 through 14.

In some cases, selecting the SC-FDM sequence comprises determining that the information to be transmitted in the uplink common burst symbol comprises one or more of SRS information, SR information, or feedback information associated with a downlink transmission.

In some cases, selecting the transmission waveform additionally or alternatively comprises selecting a SC-FDM waveform sequence from a set of available SC-FDM sequences based at least in part on the information to be transmitted in the uplink common burst symbol. In some cases, selecting the transmission waveform additionally or alternatively includes selecting a SC-FDM low PAPR sequence from a set of available SC-FDM sequences based on the information to be transmitted in the uplink common burst symbol.

Figure 22:
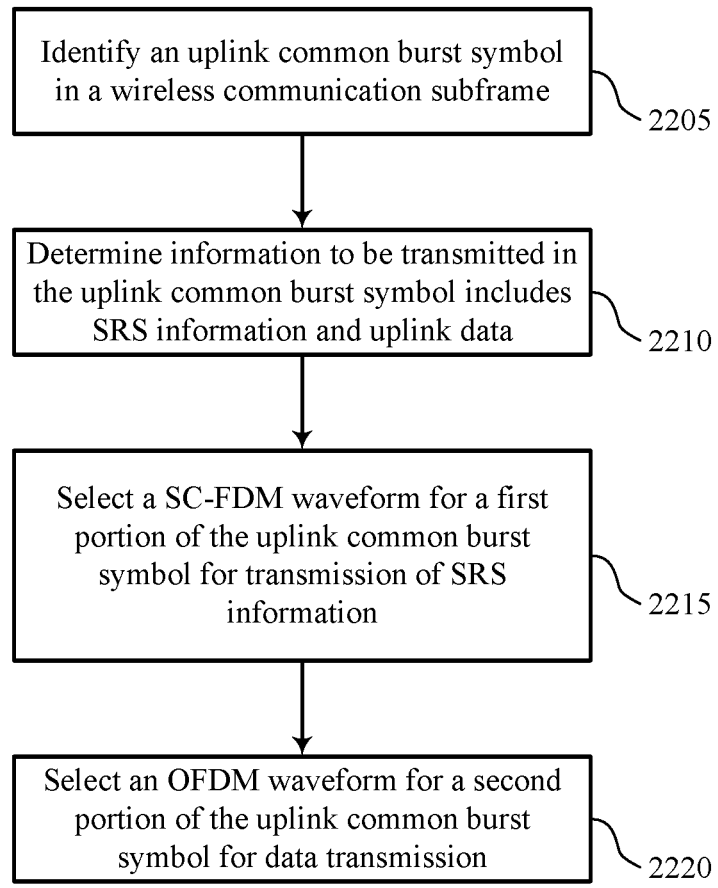

FIG. 22 shows a flowchart illustrating a method 2200 for uplink common burst symbol configuration in accordance with one or more aspects of the present disclosure. The operations of method 2200 may be implemented by a UE 115 or its components as described herein. For example, the operations of method 2200 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects the functions described below using special-purpose hardware.

At 2205 the UE 115 may identify an uplink common burst symbol in a wireless communication subframe. The operations of block 2205 may be performed according to the methods described with reference to FIGS. 1 through 10. In some examples, aspects of the operations of block 2205 may be performed by a UL common burst component as described with reference to FIGS. 11 through 14.

At 2210 the UE 115 may determine information to be transmitted in the uplink common burst symbol includes SRS information and uplink data. The operations of block 2210 may be performed according to the methods described with reference to FIGS. 1 through 10. In some examples, aspects of the operations of block 2210 may be performed by a UL information component as described with reference to FIGS. 11 through 14.

At 2215 the UE 115 select a SC-FDM waveform for a first portion of the uplink common burst symbol for transmission of SRS information. The operations of block 2215 may be performed according to the methods described with reference to FIGS. 1 through 10. In some examples, aspects of the operations of block 2215 may be performed by a waveform selection component as described with reference to FIGS. 11 through 14.

At 2220 the UE 115 may select an OFDM waveform for a second portion of the uplink common burst symbol for data transmission. The operations of block 2220 may be performed according to the methods described with reference to FIGS. 1 through 10. In some examples, aspects of the operations of block 2220 may be performed by a OFDM waveform component as described with reference to FIGS. 11 through 14.

In some cases, the information to be transmitted in the uplink common burst symbol additionally or alternatively comprises SRS information, and wherein selecting the transmission waveform additionally or alternatively comprises selecting a SC-FDM waveform for a first portion of the uplink common burst symbol for transmission of the SRS information.

In some cases, the information to be transmitted in the uplink common burst symbol comprises uplink data, and wherein selecting the transmission waveform comprises: selecting an OFDM waveform for at least a portion of the uplink common burst symbol.

Figure 23:
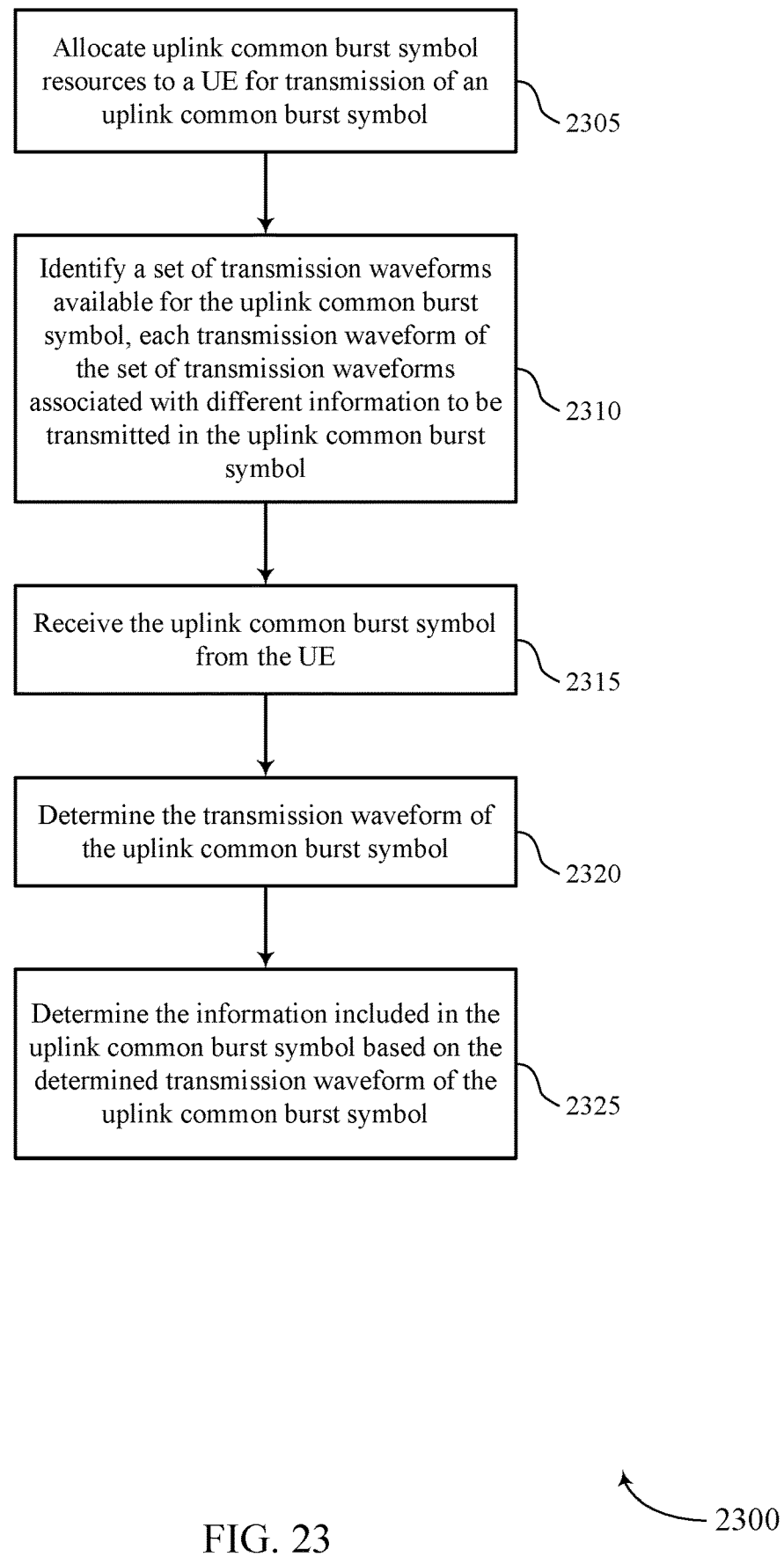

FIG. 23 shows a flowchart illustrating a method 2300 for uplink common burst symbol configuration in accordance with one or more aspects of the present disclosure. The operations of method 2300 may be implemented by a base station 105 or its components as described herein. For example, the operations of method 2300 may be performed by a base station communications manager as described with reference to FIGS. 15 through 18. In some examples, a base station 105 may execute a set of codes to control the functional elements of the device to perform the functions described below. Additionally or alternatively, the base station 105 may perform aspects the functions described below using special-purpose hardware.

At 2305 the base station 105 may allocate uplink common burst symbol resources to a UE for transmission of an uplink common burst symbol. The operations of block 2305 may be performed according to the methods described with reference to FIGS. 1 through 10. In some examples, aspects of the operations of block 2305 may be performed by a resource allocation component as described with reference to FIGS. 15 through 18.

At 2310 the base station 105 may identify a set of transmission waveforms available for the uplink common burst symbol, each transmission waveform of the set of transmission waveforms associated with different information to be transmitted in the uplink common burst symbol. The operations of block 2310 may be performed according to the methods described with reference to FIGS. 1 through 10. In some examples, aspects of the operations of block 2310 may be performed by a waveform identification component as described with reference to FIGS. 15 through 18.

At 2315 the base station 105 may receive the uplink common burst symbol from the UE. The operations of block 2315 may be performed according to the methods described with reference to FIGS. 1 through 10. In some examples, aspects of the operations of block 2315 may be performed by a common burst receiver as described with reference to FIGS. 15 through 18.

At 2320 the base station 105 may determine the transmission waveform of the uplink common burst symbol. The operations of block 2320 may be performed according to the methods described with reference to FIGS. 1 through 10. In some examples, aspects of the operations of block 2320 may be performed by a waveform determination component as described with reference to FIGS. 15 through 18.

At 2325 the base station 105 may determine the information included in the uplink common burst symbol based at least in part on the determined transmission waveform of the uplink common burst symbol. The operations of block 2325 may be some according to the methods described with reference to FIGS. 1 through 10. In some examples, aspects of the operations of block 2325 may be performed by an information determination component as described with reference to FIGS. 15 through 18.

Figure 24:
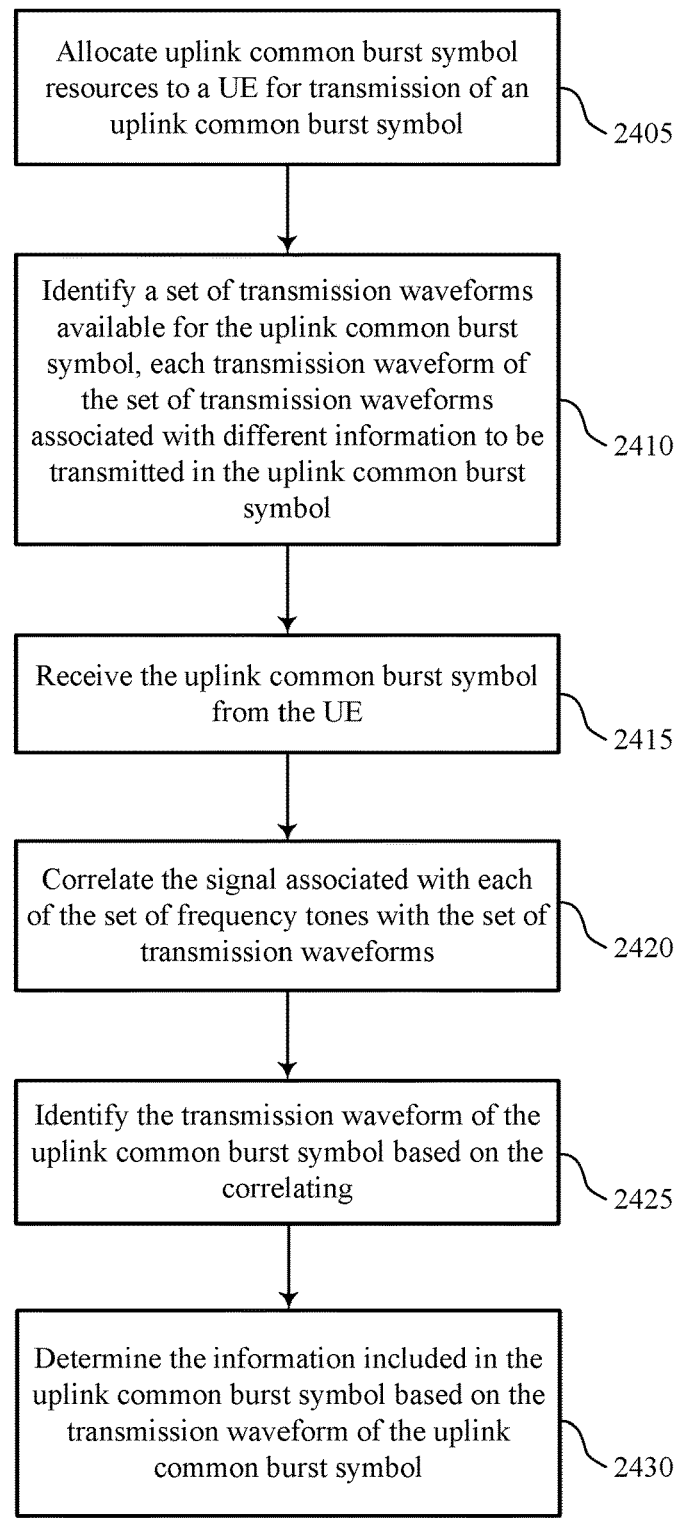

FIG. 24 shows a flowchart illustrating a method 2400 for uplink common burst symbol configuration in accordance with one or more aspects of the present disclosure. The operations of method 2400 may be implemented by a base station 105 or its components as described herein. For example, the operations of method 2400 may be performed by a base station communications manager as described with reference to FIGS. 15 through 18. In some examples, a base station 105 may execute a set of codes to control the functional elements of the device to perform the functions described below. Additionally or alternatively, the base station 105 may perform aspects the functions described below using special-purpose hardware.

At 2405 the base station 105 may allocate uplink common burst symbol resources to a UE for transmission of an uplink common burst symbol. The operations of block 2405 may be performed according to the methods described with reference to FIGS. 1 through 10. In some examples, aspects of the operations of block 2405 may be performed by a resource allocation component as described with reference to FIGS. 15 through 18.

At 2410 the base station 105 may identify a set of transmission waveforms available for the uplink common burst symbol, each transmission waveform of the set of transmission waveforms associated with different information to be transmitted in the uplink common burst symbol. The operations of block 2410 may be performed according to the methods described with reference to FIGS. 1 through 10. In some examples, aspects of the operations of block 2410 may be performed by a waveform identification component as described with reference to FIGS. 15 through 18.

At 2415 the base station 105 may receive the uplink common burst symbol from the UE. The operations of block 2415 may be performed according to the methods described with reference to FIGS. 1 through 10. In some examples, aspects of the operations of block 2415 may be performed by a common burst receiver as described with reference to FIGS. 15 through 18.

At 2420 the base station 105 may correlate the signal associated with each of the plurality of frequency tones with the set of transmission waveforms. The operations of block 2420 may be performed according to the methods described with reference to FIGS. 1 through 10. In some examples, aspects of the operations of block 2420 may be performed by a waveform correlation component as described with reference to FIGS. 15 through 18.

At 2425 the base station 105 may identify the transmission waveform of the uplink common burst symbol based at least in part on the correlating. The operations of block 2425 may be performed according to the methods described with reference to FIGS. 1 through 10. In some examples, aspects of the operations of block 2425 may be performed by a waveform correlation component as described with reference to FIGS. 15 through 18.

At 2430 the base station 105 may determine the information included in the uplink common burst symbol based at least in part on the determined transmission waveform of the uplink common burst symbol. The operations of block 2430 may be performed according to the methods described with reference to FIGS. 1 through 10. In some examples, aspects of the operations of block 2430 may be performed by an information determination component as described with reference to FIGS. 15 through 18.

In some cases, the set of transmission waveforms comprises one or more of a SC-FDM waveform or an OFDM waveform.

In some cases, determining the transmission waveform of the uplink common burst symbol comprises determining a signal associated with each of a plurality of frequency tones of the received the uplink common burst symbol.

In some cases, the set of transmission waveforms comprises a subset of SC-FDM waveforms having different sequences, and wherein the transmission waveform of the uplink common burst symbol is selected from the subset of SC-FDM waveforms based at least in part on the information to be transmitted in the uplink common burst symbol.

In some cases, the information to be transmitted in the uplink common burst symbol comprises one or more of SRS information, SR information, or feedback information associated with a downlink transmission, and wherein the subset of SC-FDM waveforms comprises a first plurality of wideband SC-FDM sequences and a second plurality of narrowband SC-FDM sequences, and wherein the transmission waveform of the uplink common burst symbol is selected from the first plurality of wideband SC-FDM sequences when SRS information is transmitted in the uplink common burst symbol, and the transmission waveform of the uplink common burst symbol is selected from the second plurality narrowband SC-FDM sequences when no SRS information is transmitted in the uplink common burst symbol.

Figure 25:
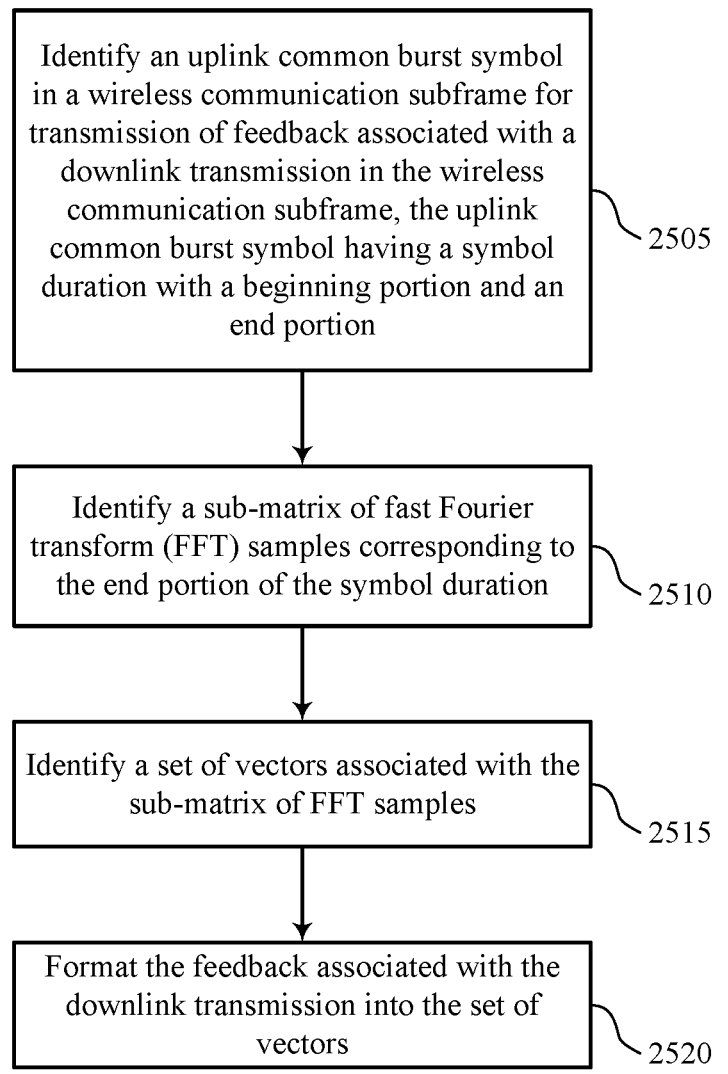

FIG. 25 shows a flowchart illustrating a method 2500 for uplink common burst symbol configuration in accordance with one or more aspects of the present disclosure. The operations of method 2500 may be implemented by a UE 115 or its components as described herein. For example, the operations of method 2500 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects the functions described below using special-purpose hardware.

At 2505 the UE 115 may identify an uplink common burst symbol in a wireless communication subframe for transmission of feedback associated with a downlink transmission in the wireless communication subframe, the uplink common burst symbol having a symbol duration with a beginning portion and an end portion. The operations of block 2505 may be performed according to the methods described with reference to FIGS. 1 through 10. In some examples, aspects of the operations of block 2505 may be performed by a UL common burst component as described with reference to FIGS. 11 through 14.

At 2510 the UE 115 may identify a sub-matrix of FFT samples corresponding to the end portion of the symbol duration. The operations of block 2510 may be performed according to the methods described with reference to FIGS. 1 through 10. In some examples, aspects of the operations of block 2510 may be performed by a FFT component as described with reference to FIGS. 11 through 14.

At 2515 the UE 115 may identify a set of vectors associated with the sub-matrix of FFT samples. The operations of block 2515 may be performed according to the methods described with reference to FIGS. 1 through 10. In some examples, aspects of the operations of block 2515 may be performed by a vector identification component as described with reference to FIGS. 11 through 14.

At 2520 the UE 115 may format the feedback associated with the downlink transmission into the set of vectors. The operations of block 2520 may be performed according to the methods described with reference to FIGS. 1 through 10. In some examples, aspects of the operations of block 2520 may be performed by a feedback component as described with reference to FIGS. 11 through 14.

It should be noted that the methods described above describe possible implementations, and that the operations may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of UMTS that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term eNB may for example be used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, gNBs, small cell eNBs, relay base stations, and the like. There may be overlapping geographic coverage areas for different technologies.

A macro cell for example covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a CSG, UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 and wireless communication system 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C). As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying an uplink common burst symbol in a wireless communication subframe;
   determining information to be transmitted in the uplink common burst symbol; and
   selecting a sequence from a set of sequences based at least in part on the information to be transmitted in the uplink common burst symbol, wherein the set of sequences each have a sequence length of N and the information to be transmitted in the uplink common burst symbol having M possible states, and wherein the set of sequences are configured to provide equally spaced sequences for M cyclic shifts associated with the M possible states of the information.

2. The method of claim 1, wherein the set of sequences comprise different sequences transmitted on a same frequency band, each of the different sequences associated with a different combination of scheduling request (SR), or feedback information, or sounding reference signal (SRS) information, or any combination thereof.

3. The method of claim 2, wherein the same frequency band may be contiguous resource blocks or dis-contiguous resource blocks.

4. The method of claim 1, wherein the cyclic shifts are selected to provide a subset of frequency tones having a same frequency value irrespective of the cyclic shifts from a base sequence.

5. The method of claim 1, wherein N is not a multiple of M.

6. The method of claim 1, wherein N is a multiple of M.

7. The method of claim 1, wherein each of the cyclic shifts are associated with a combination of sounding reference signal (SRS), scheduling request (SR) and feedback information.

8. The method of claim 1, wherein the selecting the sequence from the set of sequences further comprises:
   selecting a single-carrier frequency division multiplexing (SC-FDM) waveform sequence from a set of available SC-FDM sequences based at least in part on the information to be transmitted in the uplink common burst symbol.

9. The method of claim 8, wherein the selecting the SC-FDM sequence comprises:
   determining that the information to be transmitted in the uplink common burst symbol comprises one or more of sounding reference signal (SRS) information, scheduling request (SR) information, or feedback information associated with a downlink transmission;
   identifying a set of wideband SC-FDM sequences and a set of narrowband SC-FDM sequences;
   selecting the SC-FDM sequence from the set of wideband SC-FDM sequences when the SRS information is to be transmitted in the uplink common burst symbol; and
   selecting the SC-FDM sequence from the set of narrowband SC-FDM sequences when no SRS information is to be transmitted in the uplink common burst symbol.

10. The method of claim 9, wherein the set of narrowband SC-FDM sequences comprise different sequences transmitted on a same frequency band, each of the different sequences associated with a different combination of SR, and the feedback information.

11. The method of claim 8, wherein the selecting the SC-FDM sequence comprises:
    determining that the information to be transmitted in the uplink common burst symbol comprises one or more of sounding reference signal (SRS) information, scheduling request (SR) information, or feedback information associated with a downlink transmission;
    identifying a set of wideband SC-FDM sequences and a set of narrowband SC-FDM sequences;
    selecting the SC-FDM sequence from the set of wideband SC-FDM sequences when the SRS information is to be transmitted in the uplink common burst symbol; and
    selecting the SC-FDM sequence from the set of narrowband SC-FDM sequences when no SRS information is to be transmitted in the uplink common burst symbol.

12. The method of claim 11, wherein the SR information comprises an indication of whether a SR is present, and the feedback information comprises an acknowledgment indication, a negative acknowledgment indication, or an indication that the feedback information is not present, and wherein the set of wideband SC-FDM sequences comprises different wideband SC-FDM sequences each associated with a different combination of SRS, SR, and the feedback information and different narrowband SC-FDM sequences each associated with a different combination of SR, and the feedback information.

13. The method of claim 11, wherein the set of narrowband SC-FDM sequences comprise a same sequence transmitted on different narrowband resources, each of the different narrowband resources associated with a different combination of SR, and the feedback information.

14. The method of claim 1, further comprising:
    selecting one or more of a single-carrier frequency division multiplexing (SC-FDM) waveform or an orthogonal frequency division multiplexing (OFDM) waveform for the uplink common burst symbol based at least in part on the information to be transmitted in the uplink common burst symbol;
    selecting the SC-FDM waveform when the information to be transmitted in the uplink common burst symbol comprises sounding reference signal (SRS) information, scheduling request (SR) information, feedback information associated with a downlink transmission, or combinations thereof; and
    the method further comprising selecting the OFDM waveform when the information to be transmitted in the uplink common burst symbol comprises uplink data.

15. The method of claim 14, further comprising:
    selecting the SC-FDM waveform for a first subset of a set of frequency resources of the uplink common burst symbol and selecting the OFDM waveform for a second subset of the set of frequency resources of the uplink common burst symbol when the information to be transmitted comprises both uplink data and one or more of the SRS information, the SR information, or the feedback information, wherein the set of frequency resources comprises a plurality of frequency tones associated with a plurality of subcarriers used to transmit the uplink common burst symbol, and wherein the first subset of the set of frequency resources and the second subset of the set of frequency resources comprise alternating tones of the plurality of frequency tones.

16. The method of claim 1, wherein the information to be transmitted in the uplink common burst symbol comprises uplink data, and wherein the selecting comprises:
  selecting an orthogonal frequency division multiplexing (OFDM) waveform for at least a portion of the uplink common burst symbol.

17. The method of claim 16, wherein the information to be transmitted in the uplink common burst symbol further comprises sounding reference signal (SRS) information, and wherein the selecting further comprises:
  selecting a SC-FDM waveform for a first portion of the uplink common burst symbol for transmission of the SRS information; and
  selecting the OFDM waveform for a second portion of the uplink common burst symbol.

18. The method of claim 17, wherein a set of frequency resources comprises a plurality of frequency tones associated with a plurality of subcarriers used to transmit the uplink common burst symbol, and wherein the first portion of the uplink common burst symbol and the second portion of the uplink common burst symbol comprise alternating tones of the plurality of frequency tones.

19. The method of claim 16, further comprising:
  transmitting a demodulation reference signal (DMRS) in a transmission waveform, wherein the uplink data includes feedback information that is modulated on the DMRS.

20. The method of claim 1, wherein the set of sequences are configured to provide detection based at least in part on the cyclic shifts from a base sequence.

21. A method for wireless communication, comprising:
  allocating uplink common burst symbol resources to a user equipment (UE) for transmission of an uplink common burst symbol;
  identifying a set of transmission waveforms available for the uplink common burst symbol, each transmission waveform of the set of transmission waveforms associated with different information to be transmitted in the uplink common burst symbol, wherein the set of transmission waveforms comprise a set of sequences, and wherein the set of sequences are configured to provide detection based at least in part on cyclic shifts from a base sequence;
  receiving the uplink common burst symbol from the UE;
  determining the transmission waveform of the uplink common burst symbol; and
  determining the information included in the uplink common burst symbol based at least in part on the determined transmission waveform of the uplink common burst symbol.

22. The method of claim 21, wherein the set of transmission waveforms comprises one or more of a single-carrier frequency division multiplexing (SC-FDM) waveform or an orthogonal frequency division multiplexing (OFDM) waveform.

23. The method of claim 22, wherein the set of transmission waveforms comprises a subset of SC-FDM waveforms having different sequences, and wherein the transmission waveform of the uplink common burst symbol is selected from the subset of SC-FDM waveforms based at least in part on the information to be transmitted in the uplink common burst symbol.

24. The method of claim 23, wherein
  the information to be transmitted in the uplink common burst symbol comprises one or more of sounding reference signal (SRS) information, scheduling request (SR) information, or feedback information associated with a downlink transmission, and wherein the subset of SC-FDM waveforms comprises a first plurality of wideband SC-FDM sequences and a second plurality of narrowband SC-FDM sequences, and
  wherein the transmission waveform of the uplink common burst symbol is selected from the first plurality of wideband SC-FDM sequences when SRS information is transmitted in the uplink common burst symbol, and the transmission waveform of the uplink common burst symbol is selected from the second plurality of narrowband SC-FDM sequences when no SRS information is transmitted in the uplink common burst symbol.

25. The method of claim 24, wherein the determining transmission waveform of the uplink common burst symbol comprises:
  determining a signal associated with each of a plurality of frequency tones of the received the uplink common burst symbol;
  correlating the signal associated with each of the plurality of frequency tones with the set of transmission waveforms, wherein the correlating comprises:
    applying an inverse discrete Fourier transform (IDFT) to the plurality of frequency tones of the received the uplink common burst symbol to generate a time domain sequence; and
    performing a plurality of cyclic shifts on the time domain sequence, each of the plurality of cyclic shifts corresponding to a different transmission waveform of the set of transmission waveforms; and
    identifying the transmission waveform of the uplink common burst symbol based at least in part on the correlating.

26. An apparatus for wireless communication, comprising:
  a processor;
  memory in electronic communication with the processor; and
  the processor and the memory configured to:
    identify an uplink common burst symbol in a wireless communication subframe;
    determine information to be transmitted in the uplink common burst symbol; and
    select a sequence from a set of sequences based at least in part on the information to be transmitted in the uplink common burst symbol, wherein the set of sequences each have a sequence length of N and the information to be transmitted in the uplink common burst symbol having M possible states, and wherein the set of sequences are configured to provide equally spaced sequences for M cyclic shifts associated with the M possible states of the information.

27. The apparatus of claim 26, wherein the set of sequences comprise different sequences transmitted on a same frequency band, each of the different sequences associated with a different combination of scheduling request (SR), or feedback information, or sounding reference signal (SRS) information, or any combination thereof.

28. The apparatus of claim 26, wherein the set of sequences are configured to provide detection based at least in part on the cyclic shifts from a base sequence.

* * * * *